United States Patent
Suzuki

(10) Patent No.: US 9,550,520 B2
(45) Date of Patent: Jan. 24, 2017

(54) ROTATING ELECTRIC MACHINE CONTROL DEVICE AND ELECTRIC POWER STEERING DEVICE USING THE SAME

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/867,426

(22) Filed: Sep. 28, 2015

(65) Prior Publication Data

US 2016/0111988 A1 Apr. 21, 2016

(30) Foreign Application Priority Data

Oct. 17, 2014 (JP) .................................. 2014-212785

(51) Int. Cl.
*B62D 5/04* (2006.01)
*H02H 1/00* (2006.01)
*H02P 6/12* (2006.01)

(52) U.S. Cl.
CPC ............... *B62D 5/046* (2013.01); *H02H 1/00* (2013.01); *H02P 29/0241* (2016.02)

(58) Field of Classification Search
CPC .......... B62D 5/04; B62D 5/046; H02P 27/08; H02P 6/12; H02H 1/00
USPC ... 701/41, 22, 30.8, 309, 31.1; 318/561, 503
See application file for complete search history.

(56) References Cited

U.S. PATENT DOCUMENTS

| | | | |
|---|---|---|---|
| 4,558,265 A * | 12/1985 | Hayashida | G05B 19/416 318/561 |
| 2006/0056206 A1 | 3/2006 | Kifuku et al. | |
| 2011/0087456 A1 | 4/2011 | Satou et al. | |
| 2012/0019181 A1 | 1/2012 | Suzuki | |
| 2013/0002178 A1 * | 1/2013 | Endou | H02P 6/153 318/400.11 |
| 2014/0239870 A1 * | 8/2014 | Nawa | H02M 7/53871 318/503 |
| 2014/0253006 A1 | 9/2014 | Satou et al. | |
| 2015/0214882 A1 | 7/2015 | Suzuki | |

* cited by examiner

*Primary Examiner* — Tan Q Nguyen
(74) *Attorney, Agent, or Firm* — Knobbe, Martens, Olson & Bear, LLP

(57) ABSTRACT

A rotating electric machine control device for controlling a rotating electric machine having a winding set with windings for multiple phases includes: an inverter having upper and lower arm elements connected to high and low potential sides, respectively, and converting an electric power of the rotating electric machine; a terminal voltage detection device detecting a terminal voltage of each phase; a resistor connecting each phase and a positive side of a power supply; and a control device having a signal generation device generating a control signal for the upper and lower arm elements and a failure detection device detecting a failure based on a sum of the terminal voltage in all phases when all control signals represents an off command, and a rotation speed of the rotating electric machine is lower than a threshold.

6 Claims, 14 Drawing Sheets

ROTATING ELECTRIC MACHINE CONTROL DEVICE AND ELECTRIC POWER STEERING DEVICE USING THE SAME

CROSS REFERENCE TO RELATED APPLICATION

This application is based on Japanese Patent Application No. 2014-212785 filed on Oct. 17, 2014, the disclosure of which is incorporated herein by reference.

TECHNICAL FIELD

The present disclosure relates to a rotating electric machine control device and an electric power steering device using the same.

BACKGROUND

A failure detection device is used to detect a failure of an inverter. For example, JP-2006-81327-A (corresponding to US 2006/0056206) describes an inverter failure detection device that determines a failure of an inverter on the basis of a sum of terminal voltages of respective phases while the inverter is driven under PWM (Pulse Width Modulation) control.

Above-mentioned JP-2006-81327-A, however, neither describes nor implies in which manner a failure detection is performed when a motor is not driven. Further, in the case of a motor applied to, for example, an electric power steering device, the motor may possibly rotate even before the motor is driven in response to an operation on a steering wheel by a driver. When a rotating electric machine is set in motion by an external force, the inverter failure detection device may possibly fail to perform a pre-drive failure detection normally due to the influence of a counter-electromotive force.

SUMMARY

It is an object of the present disclosure to provide a rotating electric machine control device capable of appropriately performing an failure detection and an electric power steering device using the rotating electric machine control device.

A rotating electric machine control device for controlling a rotating electric machine having at least one winding set, which includes a plurality of windings for a plurality of phases respectively, includes: at least one inverter having an upper arm element connected to a high-potential side and a lower arm element connected to a low-potential side of the upper arm element, and converting an electric power of the rotating electric machine; a terminal voltage detection device detecting a terminal voltage of each phase of a respective winding; a resistor connecting each phase of a respective winding and a positive side of a power supply; and a control device having a signal generation device that generates a control signal for controlling an on and off operation of the upper arm element and the lower arm element, and a failure detection device that detects a failure based on a sum of the terminal voltage in all of the phases when all of the control signals relating to the upper arm element and the lower arm element represents an off command, and a rotation speed of the rotating electric machine is lower than a predetermined rotation speed threshold.

For example, in the case of a motor that is not driven by an external force other than power corresponding to the control signals, when all of the control signals are OFF commands, the motor is not driven and hence no counter-electromotive force is generated. On the other hand, when the rotating electric machine is driven by an external force other than power corresponding to the control signals, a counter-electromotive force may possibly be generated even when all of the control signals are OFF commands.

In order to eliminate such a possibility, the disclosure is configured in such a manner that an failure detection is performed on the basis of a sum of the terminal voltages of all phases, which is unsusceptible to a counter-electromotive force, in a range of the rotation speed of the rotating electric machine within which the terminal voltages are not limited by a bus voltage. Owing to the configuration as above, an failure detection can be performed appropriately without the influence of a counter-electromotive force at an initial check or the like in a system in which the rotating electric machine may possibly be driven by an external force even when all of the control signals relating to the upper arm elements and the lower arm elements are OFF commands.

An example of "a system in which the rotating electric machine may possibly be driven by an external force even when all of the control signals are OFF commands" is an electric power steering device. In the electric power steering device, the rotating electric machine rotates in response to an operation on a steering member by a driver even when all of the control signals relating to the upper arm elements and the lower arm elements are OFF commands.

According to the disclosure, however, a failure detection is performed by giving consideration to a counter-electromotive force generated when the rotating electric machine is driven by an external force other than power corresponding to the control signals. Hence, a failure detection can be performed appropriately even when the rotating electric machine rotates in response to an operation on the steering member.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, a rotating electric machine control device of the disclosure and an electric power steering device using the rotating electric machine control device will be described according to the drawings.

First Embodiment

A first embodiment of the disclosure is shown in FIG. 1 through FIG. 15.

Figure 1:
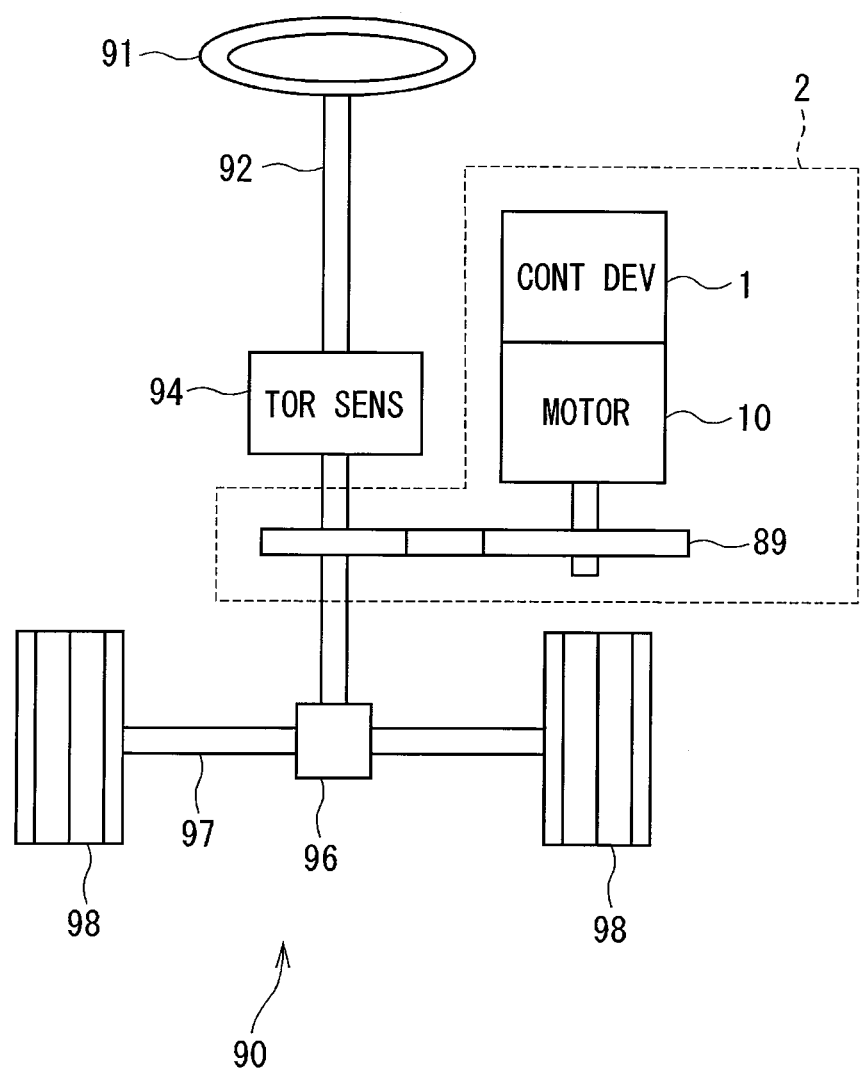
FIG. 1 is a view schematically showing a configuration of an electric power steering system according to a first embodiment of the disclosure.

As is shown in FIG. 1, a control device 1 as a rotating electric machine control device together with a motor 10 as a rotating electric machine is applied to an electric power steering device 2 that assists a steering operation of a driver.

FIG. 1 shows a configuration of a steering system 90 including the electric power steering device 2. The steering system 90 is formed of a handle (steering wheel) 91 as a steering member, a steering shaft 92, a pinion gear 96, a rack shaft 97, wheels 98, the electric power steering device 2, and so on.

The steering wheel 91 is connected to the steering shaft 92. The steering shaft 92 is provided with a torque sensor 94 that detects a steering torque inputted when the driver operates the steering wheel 91. The pinion gear 96 is provided at a tip end of the steering shaft 92 and the pinion gear 96 is meshed with the rack shaft 97. A pair of the wheels 98 is coupled to the rack shaft 97 at both ends via tie-rods or the like.

According to the configuration above, when the driver turns the steering wheel 91, the steering shaft 92 connected to the steering wheel 91 rotates. Rotational motion of the steering shaft 92 is converted to linear motion of the rack shaft 97 by the pinion gear 96 and a pair of the wheels 98 is steered at an angle corresponding to an amount of displacement of the rack shaft 97.

The electric power steering device 2 includes the motor 10 outputting an assisting torque to assist the steering of the steering wheel 91 by the driver, the control device 1 used for drive control of the motor 10, a reduction gear 89 reducing a speed of the rotation of the motor 10 and transferring the rotation at a reduced speed to the steering shaft 92 or the rack shaft 97, and so on.

The motor 10 is driven upon supply of power from a battery 5 (see FIG. 2) as a power supply and rotates the reduction gear 89 forward and backward.

Figure 2:
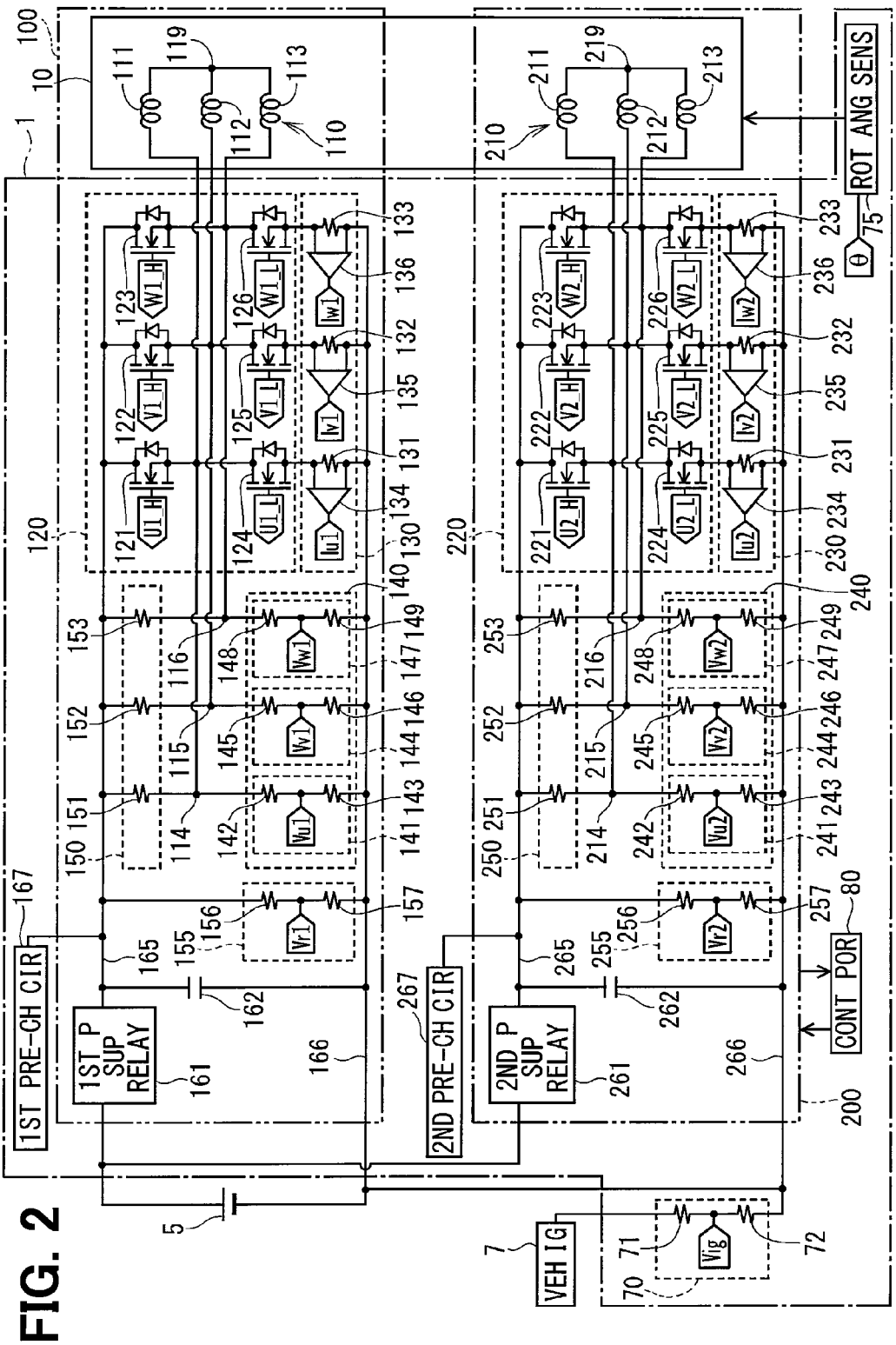
FIG. 2 is a circuit diagram of a control device according to the first embodiment of the disclosure.

As is shown in FIG. 2, the motor 10 is a three-phase brushless motor and has two winding sets 110 and 210.

The first winding set 110 has a U1 coil 111, a V1 coil 112, and a W1 coil 113. The coils 111, 112, and 113 are connected to a first inverter 120 at one ends and interconnected at the other ends at an interconnection portion 119. Hereinafter, one end of the U1 coil 111 is referred to as a U1 terminal 114, one end of the V1 coil 112 is referred to as a V1 terminal 115, and one end of the W1 coil 113 is referred to as a W1 terminal 116.

The second winding set 210 has a U2 coil 211, a V2 coil 212, and a W2 coil 213. The coils 211, 212, and 213 are connected to a second inverter 220 at one ends and interconnected at the other ends at an interconnection portion 219. Hereinafter, one end of the U2 coil 211 is referred to as a U2 terminal 214, one end of the V2 coil 212 is referred to as a V2 terminal 215, and one end of the W2 coil 213 is referred to as a W2 terminal 216.

As is shown in FIG. 2, the control device 1 drives the motor 10 under control by pulse width modulation (hereinafter, abbreviated to PWM) control or the like, and includes the first inverter 120, a first current detection portion 130, a first terminal voltage detection portion 140, a first pull-up resistor group 150, a first bus voltage detection portion 155, the second inverter 220, a second current detection portion 230, a second terminal voltage detection portion 240, a second pull-up resistor group 250, a second bus voltage detection portion 255, a rotational angle sensor 75, a control portion 80, and so on.

In the present embodiment, assume that the first winding set 110 and the respective electronic parts (first inverter 120 and so on) provided correspondingly to the first winding set 110 form a first system 100, and the second winding set 210 and the respective electronic parts (second inverter 220 and so on) provided correspondingly to the second winding set 210 form a second system 200.

In the present embodiment, regarding the components labeled with three-digit numbers, when the digit at the hundreds place is "1", the component is one of those forming the first system 100, and when the digit at the hundreds place is "2", the component is one of those forming the second system 200. When the last two digits are the same, the components are of the same configuration in the first system 100 and the second system 200.

Hereinafter, a configuration of the first system 100 will be chiefly described and when a configuration of the second system 200 is the same as the configuration of the first system 100, a description is omitted where appropriate.

The first inverter 120 is a three-phase inverter and has first upper arm elements 121, 122, and 123 and first lower arm elements 124, 125, and 126. Drains of the first upper arm elements 121, 122, and 123 are connected to a first positive-side bus 165 which is connected to a positive electrode of the battery 5 by way of a first power-supply relay 161 described below, and sources are connected to drains of the first lower arm elements 124, 125, and 126, respectively. Sources of the first lower arm elements 124, 125, and 126 are connected, respectively, by way of current sensors 131, 132, and 133, to a first negative-side bus 166 which is connected to a negative electrode of the battery 5.

A connection point of the U-phase upper arm element 121 and the U-phase lower arm element 124 making up a pair connects to the U1 terminal 114 of the U1 coil 111. A connection point of the V-phase upper arm element 122 and the V-phase lower arm element 125 making up a pair connects to the V1 terminal 115 of the V1 coil 112. A connection point of the W-phase upper arm element 123 and the W-phase lower arm element 126 making up a pair connects to the W1 terminal 116 of the W1 coil 113.

The second inverter 220 is a three-phase inverter and has second upper arm elements 221, 222, and 223 and second lower arm elements 224, 225, and 226, which are connected in the same manner as in the first inverter 120.

The upper arm elements 121 through 123 and 221 through 223 and the lower arm elements 124 through 126 and 224 through 226 of the present embodiment are MOSFETs (Metal-Oxide Semiconductor Field-Effect Transistors).

The first current detection portion 130 has the current sensors 131, 132, and 133. The current sensors 131 through 133 are provided between the respective first lower arm elements 124 through 126 and the first negative-side bus 166 and detect currents Iu1, Iv1, and Iw1 of the corresponding phases passed to the corresponding phases of the first winding set 110. In the present embodiment, the current sensors 131 through 133 are shunt resistors. Voltages across the current sensors 131, 132, and 133 are outputted to the control portion 80, respectively, by way of operational amplifiers 134, 135, and 136 as detection values relating to the currents Iu1, Iv1, and Iw1 of the corresponding phases.

In the second current detection portion 230, voltages across current sensors 231, 232, and 233 are outputted to the control portion 80, respectively, by way of operational amplifiers 234, 235, and 236 as detection values relating to currents Iu2, Iv2, and Iw2 of the corresponding phases.

Figure 3:
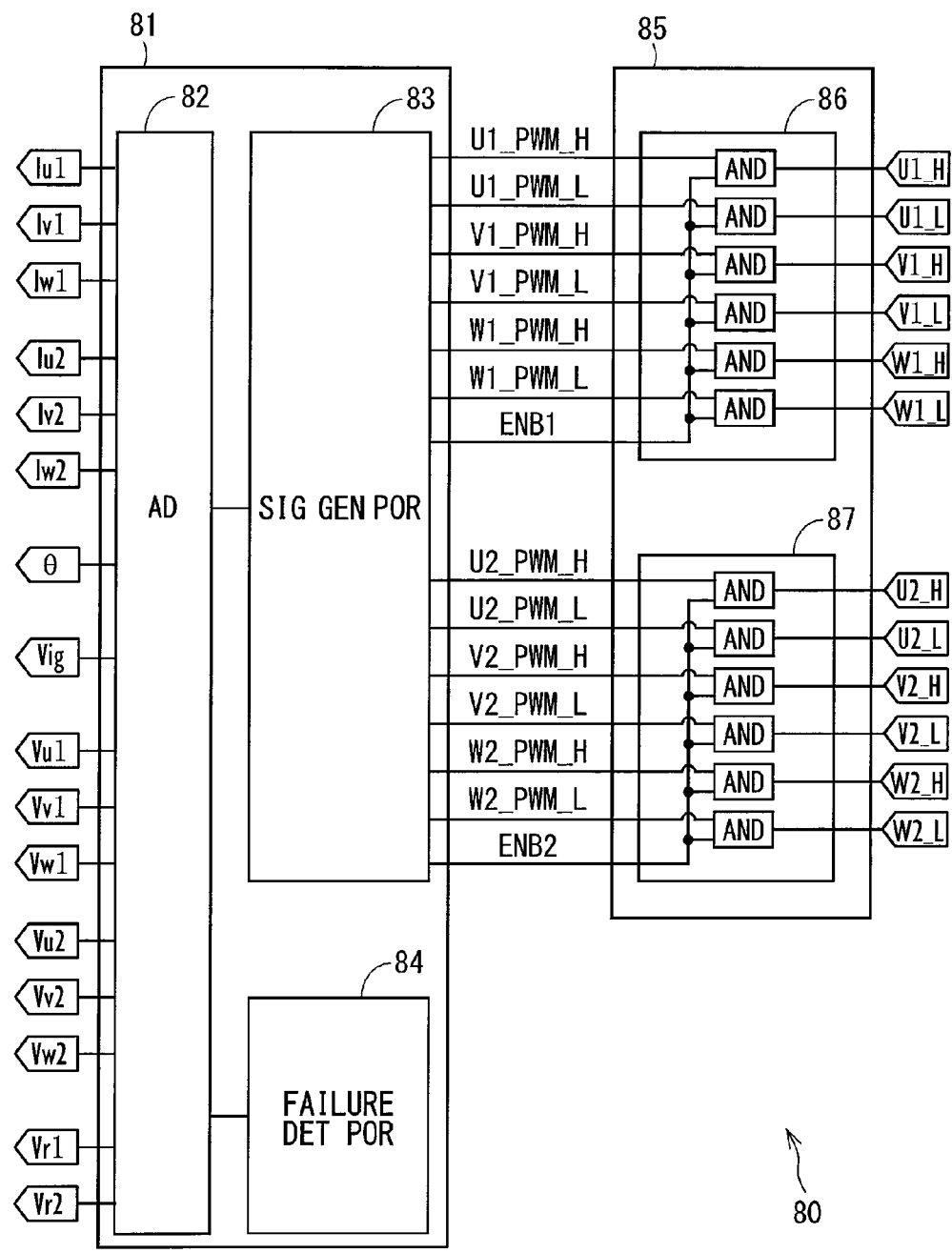
FIG. 3 is a block diagram of a control portion according to the first embodiment of the disclosure.

In FIG. 2 and FIG. 3, the detection value relating to the U-phase current Iu1 is simply denoted by "Iu1" and the same applies to the detection values relating to the currents of the other phases.

The first terminal voltage detection portion 140 is formed of a U1 terminal voltage detection portion 141, a V1 terminal voltage detection portion 144, and a W1 terminal voltage detection portion 147.

The U1 terminal voltage detection portion 141 has resistors 142 and 143 which are voltage-divider resistors, and is connected to the U1 terminal 114 of the U1 coil 111 and the first negative-side bus 166. A voltage at a connection point of the resistors 142 and 143 is outputted to the control portion 80 as a detection value relating to a terminal voltage Vu1 of the U1 coil 111.

The V1 terminal voltage detection portion 144 has resistors 145 and 146 which are voltage-divider resistors, and is connected to the V1 terminal 115 of the V1 coil 112 and the first negative-side bus 166. A voltage at a connection point of the resistors 145 and 146 is outputted to the control portion 80 as a detection value relating to a terminal voltage Vv1 of the V1 coil 112.

The W1 terminal voltage detection portion 147 has resistors 148 and 149 which are voltage-divider resistors, and is connected to the W1 terminal 116 of the W1 coil 113 and the first negative-side bus 166. A voltage at a connection point of the resistors 148 and 149 is outputted to the control portion 80 as a detection value relating to a terminal voltage Vw1 of the W1 coil 113.

In the second terminal voltage detection portion 240, a voltage at a connection point of resistors 242 and 243 of a U2 terminal voltage detection portion 241 is outputted as a detection value relating to a terminal voltage Vu2 of the U2 coil 211, a voltage at a connection point of resistors 245 and 246 of a V2 terminal voltage detection portion 244 is outputted as a detection value relating to a terminal voltage Vv2 of the V2 coil 212, and a voltage at a connection point of resistors 248 and 249 of a W2 terminal voltage detection portion 247 is outputted as a detection value relating to a terminal voltage Vw2 of the W2 coil 213. All of the detection values are outputted to the control portion 80.

The first pull-up resistor group 150 is formed of a U1 pull-up resistor 151, a V1 pull-up resistor 152, and a W1 pull-up resistor 153. The U1 pull-up resistor 151 is connected to the U1 terminal 114 of the U1 coil 111 and the first positive-side bus 165. The V1 pull-up resistor 152 is connected to the V1 terminal 115 of the V1 coil 112 and the first positive-side bus 165. The W1 pull-up resistor 153 is connected to the W1 terminal 116 of the W1 coil 113 and the first positive-side bus 165.

The first bus voltage detection portion 155 has resistors 156 and 157 which are voltage-divider resistors, and is connected to the first positive-side bus 165 and the first negative-side bus 166. A voltage at a connection point of the resistors 156 and 157 is outputted to the control portion 80 as a detection value relating to a first bus voltage Vr1 which is a voltage of the first positive-side bus 165.

In the second bus voltage detection portion 255, a voltage at a connection point of resistors 256 and 257 is outputted to the control portion 80 as a detection value relating to a second bus voltage Vr2 which is a voltage of a second positive-side bus 265.

The first power-supply relay 161 is provided between the battery 5 and the first inverter 120 as well as the respective detection portions 140 and 155, and capable of interrupting a supply of power from the battery 5 toward the first inverter 120.

A first capacitor 162 is connected to the first positive-side bus 165 and the first negative-side bus 166 and assists a supply of power to the first inverter 120 and restricts a noise component, such as a surge current, by storing charges.

The first positive-side bus 165 is a high-potential side wire connecting high-potential sides of the first upper arm elements 121 through 123 and the positive electrode of the battery 5, and disposed downstream of the first power-supply relay 161 (that is, on the opposite side of the battery 5). The first negative-side bus 166 is a low-potential side wire connecting low-potential sides of the first lower arm elements 124 through 126 and the negative electrode of the battery 5.

A first pre-charge circuit 167 is connected to the first power-supply relay 161 on the opposite side of the battery 5 and supplies a first pre-charge voltage Vpre1 to a downstream side of the first power-supply relay 161.

A second pre-charge circuit 267 is connected to a second power-supply relay 261 on the opposite side of the battery 5 and supplies a second pre-charge voltage Vpre2 to a downstream side of the second power-supply relay 261.

An ignition voltage detection portion 70 has resistors 71 and 72 which are voltage-divider resistors and is connected to a vehicle IG 7 and the negative electrode of the battery 5. A voltage at a connection point of the resistors 71 and 72 is outputted to the control portion 80 as a detection value relating to an IG voltage Vig.

Resistance values of the resistors forming the respective detection portions are set appropriately for the voltages at the respective points to fall within a detectable range of the control portion 80.

The rotational angle sensor 75 is provided in the vicinity of an unillustrated rotor of the motor 10 and detects a rotational angle θ of the rotor. The rotational angle sensor 75 is, for example, a magneto-resistive element configured to detect a field that varies with rotations of a magnet provided at an end of a shaft that rotates integrally with the rotor. A detection value of the rotational angle sensor 75 is outputted to the control portion 80.

In FIG. 2, control lines to the first system 100 and the like are omitted where appropriate for simplicity.

As is shown in FIG. 3, the control portion 80 includes a microcomputer 81, a drive circuit (pre-driver) 85, and so on.

The microcomputer 81 is responsible for the control of the entire control device 1 and formed of a microcomputer or the like that performs various computations on the basis of a torque detection value inputted from the torque sensor 94, a detection value relating to a rotational angle θ inputted from the rotational angle sensor 75, and so on.

The microcomputer 81 has an A-to-D conversion portion 82, a signal generation portion 83, an failure detection portion 84, and so on.

The A-to-D conversion portion 82 applies A-to-D conversion to detection values of the current detection portions 130 and 230, the terminal voltage detection portions 140 and 240, the bus voltage detection portions 155 and 255, the ignition voltage detection portion 70, the rotational angle sensor 75, and so on.

The signal generation portion 83 generates PWM signals by the PWM control according to the currents Iu1, Iv1, Iw1, Iu2, Iv2, and Iw2 of the respective phases, the rotational angle θ, and so on, and outputs the PWM signals to the drive circuit 85.

More specifically, the signal generation portion 83 generates PWM signals of the first inverter 120, including U1_PWM_H relating to driving of the U-phase upper arm element 121, U1_PWM_L relating to driving of the U-phase lower arm element 124, V1_PWM_H relating to driving of the V-phase upper arm element 122, V1_PWM_L relating to driving of the V-phase lower arm element 125, W1_PWM_H relating to driving of the W-phase upper arm element 123, and W1_PWM_L relating to driving of the W-phase lower arm element 126, and outputs the PWM signals to a first gate drive circuit 86.

Also, the signal generation portion 83 generates PWM signals of the second inverter 220, including U2_PWM_H relating to driving of the U-phase upper arm element 221, U2_PWM_L relating to driving of the U-phase lower arm element 224, V2_PWM_H relating to driving of the V-phase upper arm element 222, V2_PWM_L relating to driving of the V-phase lower arm element 225, W2_PWM_H relating to driving of the W-phase upper arm element 223, and W2_PWM_L relating to driving of the W-phase lower arm element 226, and outputs the PWM signals to a second gate drive circuit 87. In the present embodiment, assume that the respective PWM signals at a high level serve as signals to switch ON the corresponding elements and the respective PWM signals at a low level serve as signals to switch OFF the corresponding elements. Hereinafter, the signals to switch ON the respective elements are referred to as the ON signals and the signals to switch OFF the respective elements are referred to as the OFF signals.

The signal generation portion 83 generates a first enable signal ENB1 and outputs the generated signal to the first gate drive circuit 86. The signal generation portion 83 also generates a second enable signal ENB2 and outputs the generated signal to the second gate drive circuit 87.

In the present embodiment, assume that the enable signals ENB1 and ENB2 at a high level are signals to switch ON the corresponding elements and the enable signals ENB1 and ENB2 at a low level are signals to switch OFF the corresponding elements.

The failure detection portion 84 detects an failure in the winding sets 110 and 210 of the motor 10, the inverters 120 and 220, the terminal voltage detection portions 140 and 240, and the bus voltage detection portions 155 and 255 on the basis of the terminal voltages Vu1, Vv1, Vw1, Vu2, Vv2, and Vw2, the bus voltages Vr1 and Vr2, and so on. Hereinafter, an failure in the winding sets 110 and 210, the inverters 120 and 220, and so on is referred to simply as an failure in the circuit portion where appropriate.

An failure detection will be described in detail below.

The drive circuit 85 has the first gate drive circuit 86 and the second gate drive circuit 87.

The first gate drive circuit 86 is formed of AND circuits of the respective PWM signals U1_PWM_H, U1_PWM_L, V1_PWM_H, V1_PWM_L, W1_PWM_H, and W1_PWM_L and the first enable signal ENB1.

When both of the PWM signal U1_PWM_H and the first enable signal ENB1 are ON signals, a drive signal UL_H relating to the driving of the U-phase upper arm element 121 is generated as an ON signal (shifted to a high level in the present embodiment). When at least one of the PWM signal U1_PWM_H and the first enable signal ENB1 is an OFF signal, the drive signal U1_H is generated as an OFF signal (shifted to a low level in the present embodiment). The drive signal U1_H generated as above is outputted to the gate of the upper arm element 121.

A drive signal U1_L relating to the driving of the U-phase lower arm element 124, a drive signal V1_H relating to the driving of the V-phase upper arm element 122, a drive signal V1_L relating to the driving of the V-phase lower arm element 125, a drive signal W1_H relating to the driving of the W-phase upper arm element 123, and a drive signal W1_L relating to the driving of the W-phase lower arm element 126 are generated on the basis of the corresponding PWM signals and the first enable signal ENB1 in the same manner as the drive signal U1_H, and outputted to the gates of the corresponding elements 122 through 126.

The second gate drive circuit 87 is formed of AND circuits of the respective PWM signals U2_PWM_H, U2_PWM_L, V2_PWM_H, V2_PWM_L, W2_PWM_H, and W2_PWM_L and the second enable signal ENB2.

The second gate drive circuit 87 operates in the same manner as the first gate drive circuit 86. A drive signal U2_H relating to the driving of the U-phase upper arm element 221, a drive signal U2_L relating to the driving of the U-phase lower arm element 224, a drive signal V2_H relating to the driving of the V-phase upper arm element 222, a drive signal V2_L relating to the driving of the V-phase lower arm element 225, a drive signal W2_H relating to the driving of the W-phase upper arm element 223, and a drive signal W2_L relating to the driving of the W-phase lower element 226 are generated on the basis of the corresponding PWM signals and the second enable signal ENB2 in the same manner as the drive signal U1_H, and outputted to the gates of the corresponding elements 221 through 226.

In the present embodiment, the PWM signals and the enable signals ENB1 and ENB2 correspond to "control signals" and assume that when all of the PWM signals and at least one of the enable signals ENB1 and ENB2 are OFF signals, "all of the control signals relating to the upper arm elements and the lower arm elements are OFF command".

In the present embodiment, an failure detection is performed at an initial check after the vehicle IG 7 is turned ON and before the driving of the motor 10 is started using power from the battery 5.

The control device 1 of the present embodiment is applied to the electric power steering device 2. Hence, the motor 10 may possibly rotate in response to an operation on the steering wheel 91 by the driver even before a supply of power from the battery 5 starts. A counter-electromotive force is generated when the motor 10 rotates.

An influence of the counter-electromotive force on the terminal voltages in the motor 10 will now be described according to FIG. 4. Herein, a description will be given to the first system 100 and a description of the second system 200 is omitted because the description is same as the description of the first system 100.

Figure 4:
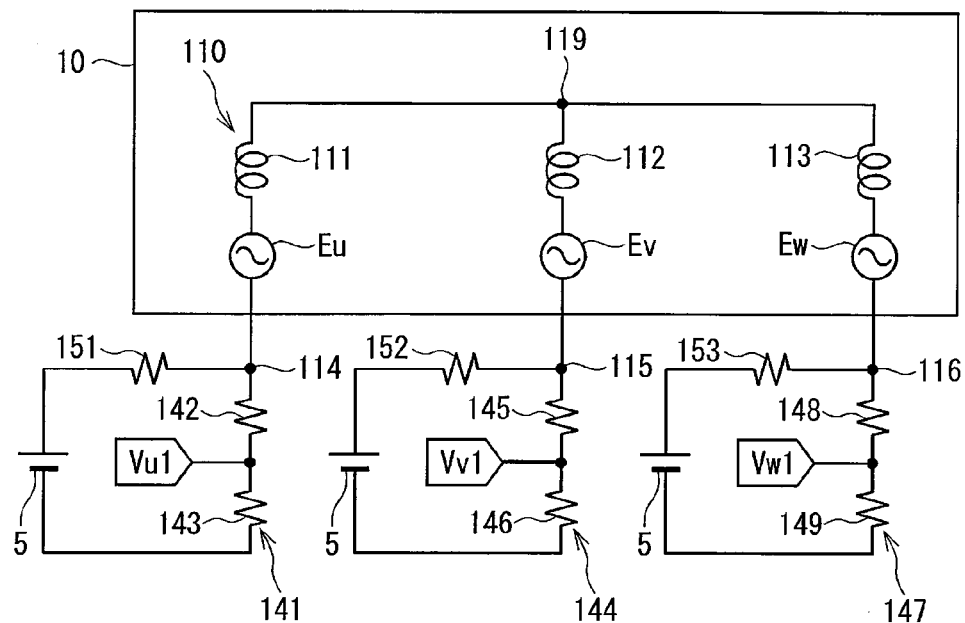
FIG. 4 is a circuit diagram of an equivalent circuit in a first system according to the first embodiment of the disclosure.

FIG. 4 is a circuit diagram of the first winding set 110, the first terminal voltage detection portion 140, and the first pull-up resistor group 150 of the first system 100, and the battery 5 in equivalent conversion. In the present embodiment, assume that the high-potential side resistors 142, 145, and 148 of the terminal voltage detection portions 141, 144, and 147, respectively, have equal resistance values, which are given as Ru. Also, the low-potential side resistors 143, 146, and 149 of the terminal voltage detection portions 141, 144, and 147, respectively, have equal resistance values, which are given as Rd. Further, the pull-up resistors 151, 152, and 153 have equal resistance values, which are given as Rup.

Let V be a battery voltage which is a voltage across the battery 5. Then, a voltage at the interconnection portion 119 of the first winding set 110 is expressed as Equation (1) below in accordance with the Kirchhoff's law. In Equation (1) below, R is Equation (2) below.

$$(V-Vu1)/Rup-Vu1/R+(V-Vv1)/Rup-Vv1/R+(V-Vw1)/Rup-Vw1/R=0$$

$$R(V-Vu1)-RupVu1+R(V-Vv1)-RupVv1+R(V-Vw1)-RupVw1=0$$

$$3RV=(R+Rup)(Vu1+Vv1+Vw1) \qquad (1)$$

$$R=Ru+Rd \qquad (2)$$

Let Eu be a counter-electromotive force of the U1 coil 111, Ev be a counter-electromotive force of the V1 coil 112, and Ew be a counter-electromotive force of the W1 coil 113. Then, the terminal voltages Vu1, Vv1, and Vw1 of the respective phases are expressed as Equations (3) and (4) below using the counter-electromotive forces Eu, Ev, and Ew.

$$Vu1-Vv1=Eu-Ev \qquad (3)$$

$$Vu1-Vw1=Eu-Ew \qquad (4)$$

By substituting Equations (3) and (4) above into Equation (1) above, we obtain Equation (5) as follows:

$$3Vu1-2Eu+Ev+Ew=3RV/(R+Rup)$$

$$3Vu1-3Eu=3RV/(R+Rup)$$

$$Vu1=RV/(R+Rup)+Eu \qquad (5).$$

Equation (1) is also re-written to Equation (6) as follows:

$$Vu1+Vv1+Vw1=3RV/(R+Rup) \qquad (6).$$

As is expressed in Equation (5) above, the terminal voltage Vu1 is under the influence of the counter-electromotive force Eu generated by the driving of the motor 10. The same applies to the terminal voltages Vv1 and Vw1. Hence, when an failure determination is made directly on the terminal voltages Vu1, Vv1, and Vw1 at the initial check, an erroneous determination may possibly be made due to the influence of the counter-electromotive forces Eu, Ev, and Ew in a case where the motor 10 rotates in response to an operation on the steering wheel 91 by the driver during the initial check.

On the other hand, as is expressed in Equation (6) above, a sum of the terminal voltages Vu1, Vv1, and Vw1 of the three phases (that is, Vu1+Vv1+Vw1) is unsusceptible to the counter-electromotive forces Eu, Ev, and Ew. In view of the foregoing, an failure detection is performed on the basis of a sum of the terminal voltages Vu1, Vv1, and Vw1 of the three phases in the present embodiment.

Figure 5:
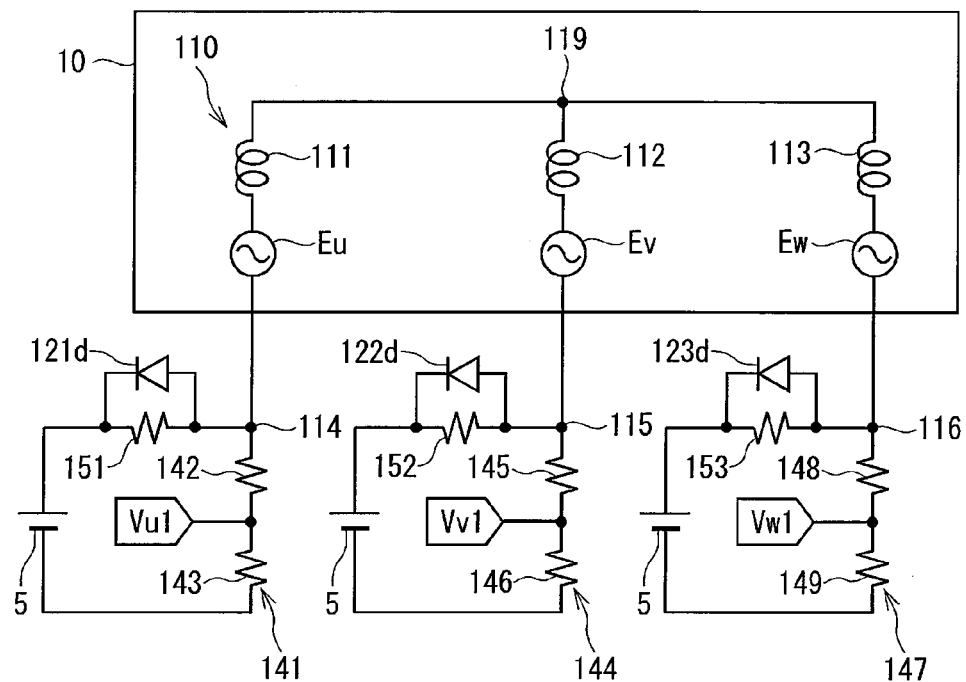
FIG. 5 is a circuit diagram of another equivalent circuit in the first system according to the first embodiment of the disclosure.
Figure 6:
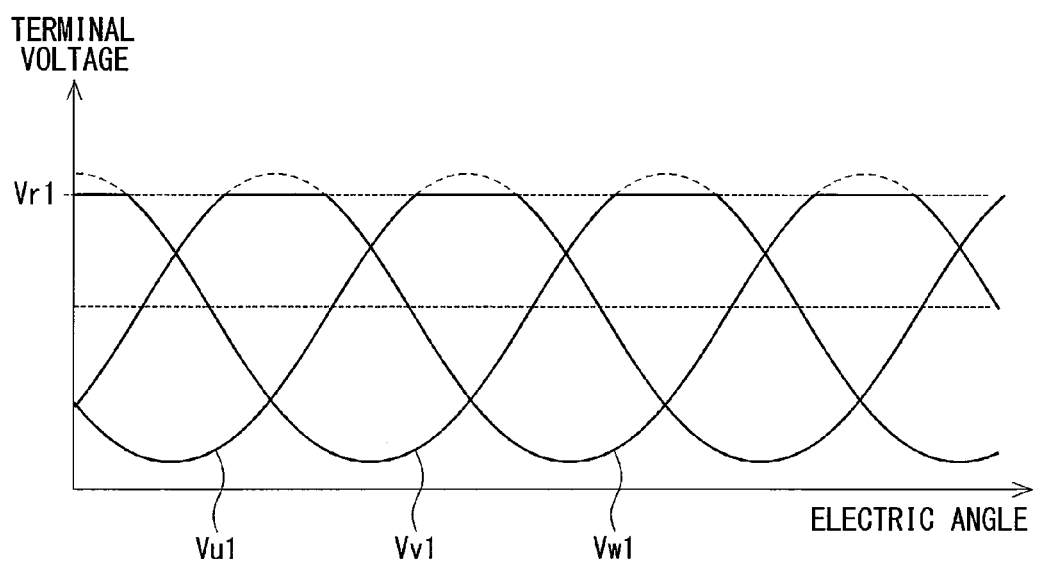
FIG. 6 is a view used to describe terminal voltages according to the first embodiment of the disclosure.

FIG. 5 is a circuit diagram of the equivalent circuit shown in FIG. 4 when consideration is given to parasitic diodes 121d, 122d, and 123d of the upper arm elements 121, 122, and 123, respectively. Hence, when the terminal voltages Vu1, Vv1, and Vw1 are higher than the first bus voltage Vr1, currents pass over the parasitic diodes 121d, 122d, and 123d and flow from the side of the first winding set 110 to the side of the battery 5. Consequently, as is shown in FIG. 6, the terminal voltages Vu1, Vv1, and Vw1 resulting from the counter-electromotive forces Eu, Ev, and Ew, respectively, are limited by the first bus voltage Vr1. Hence, when the terminal voltages Vu1, Vv1, and Vw1 are higher than the first bus voltage Vr1, an erroneous determination may possibly be made by performing an failure detection on the basis of a sum of the terminal voltages Vu1, Vv1, and Vw1 of the three phases.

In the present embodiment, such a possibility is eliminated by performing an failure detection in a range within which peak values of the terminal voltages Vu1, Vv1, and Vw1 are as high as or below the first bus voltage Vr1.

The counter-electromotive forces Eu, Ev, and Ew increase as a rotation speed of the motor 10 (hereinafter, referred to as the motor rotation speed N) becomes higher. Hence, in the present embodiment, a rotation speed threshold Nth at or below which the peak values of the terminal voltages Vu1, Vv1, and Vw1 are as high as or below the first bus voltage Vr1 is preliminary set and an failure detection is performed in a range within which the motor rotation speed N is as high as or lower than the rotation speed threshold Nth.

Failure detection processing of the present embodiment will be described according to the flowcharts of FIG. 7 through FIG. 14. The failure detection processing is initial check processing performed by the failure detection portion 84 after the vehicle IG 7 is turned ON and before the motor 10 is driven by power from the battery 5. In a case where the motor 10 is rotating during the failure detection processing, the motor 10 is rotating in response to an operation on the steering wheel 91 by the driver. In the flowcharts, the first system 100 is denoted as "system 1" and the second system 200 as "system 2". First failure detection processing is failure detection processing of the first system 100 and second failure detection processing is failure detection processing of the second system 200, and the former and the latter are performed simultaneously in parallel.

Firstly, the first failure detection processing which is the failure detection processing of the first system 100 will be described according to FIG. 7 through FIG. 10.

In first Step S101 (hereinafter, the term, "Step", is omitted and a capital S is attached at the beginning of step numbers), a determination is made as to whether a precondition for a ground fault check of the first bus voltage Vr1 is satisfied. Herein, assume that the precondition is satisfied when the IG voltage Vig is larger than a predetermined value. When it is determined that the precondition for the ground fault check of the first bus voltage Vr1 is not satisfied (S101: NO), that is, when the IG voltage Vig is as large as or less than the predetermined value, the determination processing is repeated. When it is determined that the precondition for the ground fault check of the first bus voltage Vr1 is satisfied (S101: YES), that is, when the IG voltage Vig is larger than the predetermined value, advancement is made to S102.

In S102, a determination is made as to whether the first bus voltage Vr1 is normal. When the first bus voltage Vr1 is normal, the first bus voltage Vr1 is equal to the first pre-charge voltage Vpre1 applied from the first pre-charge circuit 167. On the other hand, for example, in a case where the first capacitor 162 has a short-circuit failure or the first positive-side bus 165 and the first negative-side bus 166 are conducting, the first positive-side bus 165 has a ground fault, and the first bus voltage Vr1 decreases below the first pre-charge voltage Vpre1. Hence, it is determined in the present embodiment that the first positive-side bus 165 has a ground fault when the first bus voltage Vr1 is below a first bus ground-fault determination value VrG1. When it is determined that the first bus voltage Vr1 is normal (S102: YES), that is, when the first bus voltage Vr1 is as high as or above the first bus ground-fault determination value VrG1, advancement is made to S104. When it is determined that the first bus voltage Vr1 is not normal, that is, when the first positive-side bus 165 has a ground fault and the first bus voltage Vr1 is below the first bus ground-fault determination value VrG1, advancement is made to S103.

In S103, a first failure flag Flg1 indicating a failure of the first system 100 is turned ON, after which the first failure detection processing is ended.

In S104, the first power-supply relay 161 is turned ON.

In S105, a determination is made as to whether the rotational angle sensor 75 is normal. An failure detection of the rotational angle sensor 75 is performed by known methods, for example, a method described in JP-A-2011-99846. When it is determined that the rotational angle sensor 75 is not normal (S105: NO), advancement is made to S107. When it is determined that the rotational angle sensor 75 is normal (S105: YES), advancement is made to S106.

In S106, a determination is made as to whether a precondition for a terminal ground-fault check of the first system 100 is satisfied. Herein, it is determined that the precondition for the terminal ground-fault check is satisfied when the motor rotation speed N computed on the basis of the detection value of the rotational angle sensor 75 is lower than the rotation speed threshold Nth at or below which an failure detection is feasible. When it is determined that the precondition for the terminal ground-fault check of the first system 100 is not satisfied (S106: NO), that is, when the motor rotation speed N is as high as or higher than the rotation speed threshold Nth, the determination processing is repeated. When a time since the determination in S106 is made first exceeds a predetermined precondition waiting time, an failure determination in subsequent S111 is not performed and advancement is made to S113 of FIG. 8 by assuming that the normality is determined. The same applies to S110, S114, S118, S123, S127, S133, and S137 and corresponding processing steps in the second failure determination processing described below. Hence, when the repetition time exceeds the precondition waiting time, an failure determination in the subsequent processing step is not performed and advancement is made to after the next processing step by assuming that the normality is determined. When configured as above, a delay in starting the driving of the motor 10 can be avoided.

When it is determined that the precondition for the terminal ground-fault check of the first system 100 is satisfied (S106: YES), that is, when the motor rotation speed N is lower than the rotation speed threshold Nth, advancement is made to S111.

In S107 to which advancement is made when it is determined that the rotational angle sensor 75 is not normal (S105: NO), a determination is made as to whether a second failure flag Flg2 is OFF. The second failure flag Flg2 is a flag that is set when an failure is detected in the second failure detection processing (see FIG. 11 through FIG. 14) performed in parallel with the first failure detection processing. When it is determined that the second failure flag Flg2 is ON (S107: NO), the first failure detection processing is ended. When it is determined that the second failure flag Flg2 is OFF (S107: YES), advancement is made to S108.

In S108, first terminal voltage amplitude M1 which is amplitude of the terminal voltages Vu1, Vv1, and Vw1 of the first system 100 and second terminal voltage amplitude M2 which is amplitude of the terminal voltages Vu2, Vv2, and Vw2 of the second system 200 are computed.

The first terminal voltage amplitude M1 is computed in accordance with Equation (7) as follows and the second terminal voltage amplitude M2 is computed in accordance with Equation (8) as follows:

$$M1=\sqrt{Va1^2+Vb1^2} \quad (7)$$

where:
Va1=Vu1×cos(0°)+Vv1×cos(−120°)+Vw1×cos(120°)
and
Vb1=Vu1×sin(0°)+Vv1×sin(−120°)+Vw1×sin(120°)

$$M2=\sqrt{Va2^2+Vb2^2} \quad (8)$$

where:
Va2=Vu2×cos(0°)+Vv2×cos(−120°)+Vw2×cos(120°)
and
Vb2=Vu2×sin(0°)+Vv2×sin(−120°)+Vw2×sin(120°).

The first terminal voltage amplitude M1 and the second terminal voltage amplitude M2 are logically equal when both are normal. Hence, when an absolute value of a difference between the first terminal voltage amplitude M1 and the second terminal voltage amplitude M2 is equal to or larger than an amplitude failure determination value Me, it is determined that at least one of the first terminal voltage amplitude M1 and the second terminal voltage amplitude M2 is not normal. The amplitude failure determination value Me is set to a value close to zero depending on a detection error, a computation error, and so on.

When it is determined that the first terminal voltage amplitude M1 and the second terminal voltage amplitude M2 are normal (S108: YES), that is, when the absolute value of a difference between the first terminal voltage amplitude M1 and the second terminal voltage amplitude M2 is less than the amplitude failure determination value Me, advancement is made to S110. When it is determined that at least one of the first terminal voltage amplitude M1 and the second terminal voltage amplitude M2 is not normal (S108: NO), that is, when the absolute value of a difference between the first terminal voltage amplitude M1 and the second terminal voltage amplitude M2 is as large as or larger than the amplitude failure determination value Me, advancement is made to S109.

In S109, an amplitude failure flag FlgM is turned ON, after which the first failure detection processing is ended.

In S110, a determination is made as to whether a precondition for a terminal ground-fault check of the first system 100 is satisfied. Because S110 is a step to which advancement is made when the rotational angle sensor 75 is not normal, a determination is made on the basis of the first terminal voltage amplitude M1 instead of the motor rotation speed N. Hence, it is determined that the precondition for the terminal ground-fault check is satisfied when the first terminal voltage amplitude M1 is less than a first determination feasibility threshold Mth1. As has been described above, a determination may not be made appropriately when the terminal voltages Vu1, Vv1, and Vw1 are higher than the first bus voltage Vr1. In order to eliminated such a possibility, the first determination feasibility threshold Mth1 is set to a predetermined value which is half the first bus voltage Vr1 or less.

When it is determined that the precondition for the terminal ground-fault check of the first system 100 is not satisfied (S110: NO), that is, when the first terminal voltage amplitude M1 is as large as or larger than the first determination feasibility threshold Mth1, the determination processing is repeated during the precondition waiting time. When it is determined that the precondition for the terminal ground-fault check of the first system 100 is satisfied (S110: YES), that is, when the first terminal voltage amplitude M1 is less than the first determination feasibility threshold Mth1, advancement is made to S111.

In S111 to which advancement is made when it is determined that the precondition for the terminal ground-fault check of the first system 100 is satisfied (S106: YES or S110: YES), a determination is made as to whether the U1 terminal 114, the V1 terminal 115, and the W1 terminal 116 have a ground fault. When the U1 terminal voltage Vu1 is normal, the U1 terminal voltage Vu1 takes a predetermined value, which is the first bus voltage Vr1 corresponding to the resistance values of the resistors 142 and 143 and the U1 pull-up resistor 151. On the other hand, for example, in the event of a ground fault of the U1 coil 111, breaking of the resistor 142, a short-circuit failure of the resistor 143, or a short-circuit failure of the lower arm element 124, the U1 terminal 114 has a ground fault, and the U1 terminal voltage Vu1 takes a value smaller than the predetermined value, which is the first bus voltage Vr1 corresponding to the resistance values of the resistors 142 and 143 and the U1 pull-up resistor 151. The same applies to the V1 terminal voltage Vv1 and the W1 terminal voltage Vw1.

In view of the foregoing, it is determined in the present embodiment that the U1 terminal 114 has a ground fault when the U1 terminal voltage Vu1 is below a U1 terminal ground-fault determination value VuG1, which is a value found by multiplying the first bus voltage Vr1 by a predetermined coefficient corresponding to the resistance values. Likewise, it is determined that the V1 terminal 115 has a ground fault when the V1 terminal voltage Vv1 is below a V1 terminal ground-fault determination value VvG1, which is a value found by multiplying the first bus voltage Vr1 by a predetermined coefficient corresponding to the resistance values. Also, it is determined that the W1 terminal 116 has a ground fault when the W1 terminal voltage Vw1 is below a W1 terminal ground-fault determination value VwG1, which is a value found by multiplying the first bus voltage Vr1 by a predetermined coefficient corresponding to the resistance values. In the present embodiment, because the resistance values of the respective phases are equal, the terminal ground-fault determination values VuG1, VvG1, and VwG1 are also equal. However, the terminal ground-fault determination values VuG1, VvG1, and VwG1 may be different.

When it is determined that none of the U1 terminal 114, the V1 terminal 115, and the W1 terminal 116 has a ground fault (S111: YES), advancement is made to S113 of FIG. 8. When it is determined that at least one of the U1 terminal 114, the V1 terminal 115, and the W1 terminal 116 has a ground fault (S111: NO), advancement is made to S112.

In S112, the first failure flag Flg1 is turned ON, after which the first failure detection processing is ended.

Figure 7:
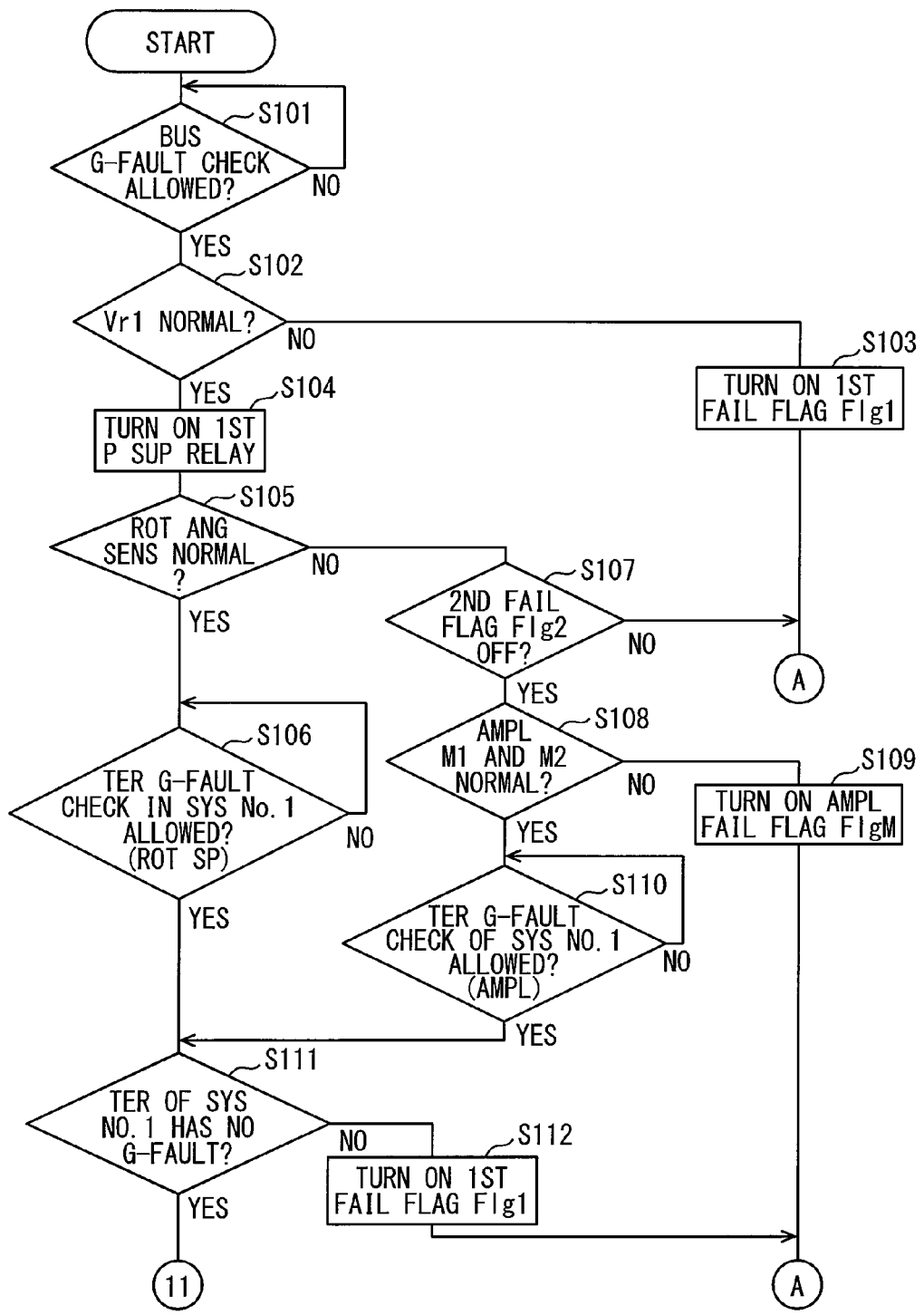
FIG. 7 is a flowchart depicting first failure detection processing according to the first embodiment of the disclosure.
Figure 8:
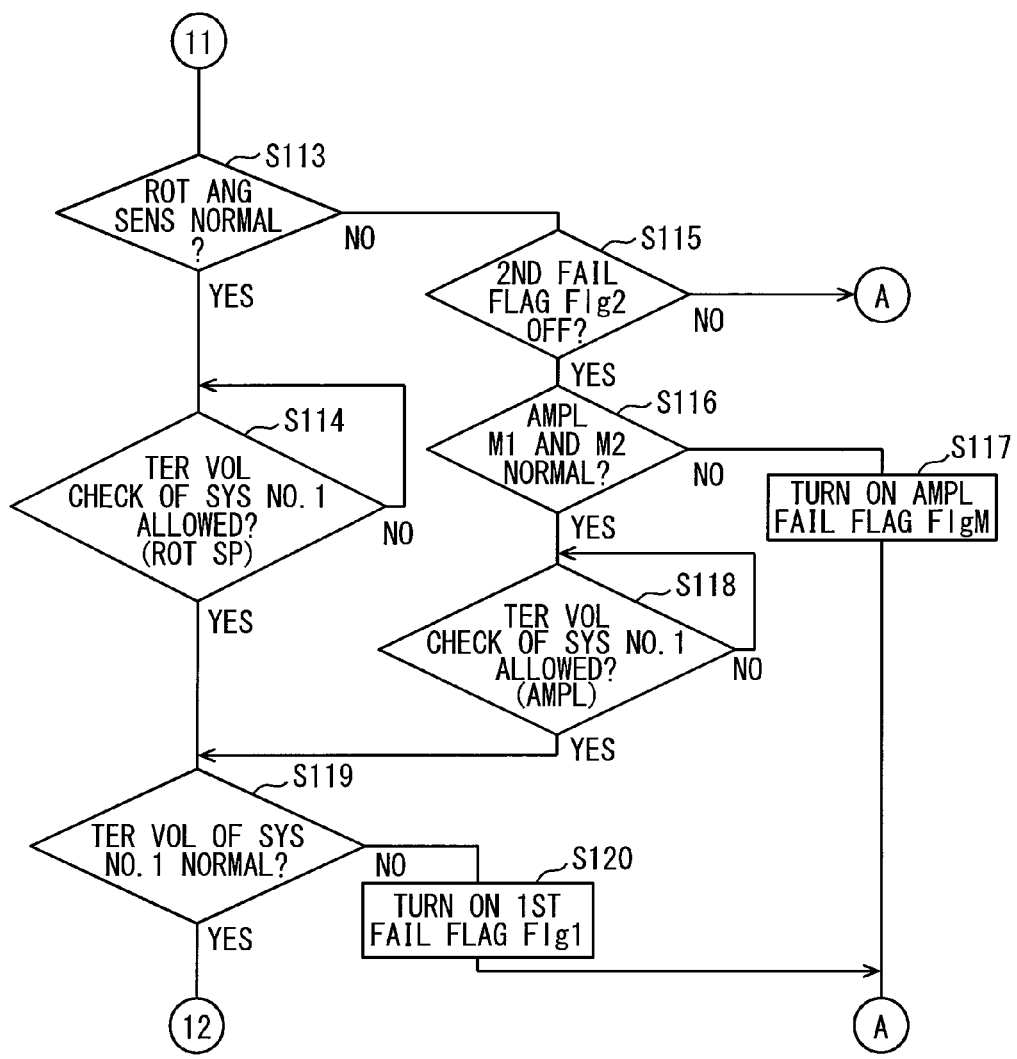
FIG. 8 is a flowchart continuing from FIG. 7 and depicting the first failure detection processing according to the first embodiment of the disclosure.

Processing in S113 of FIG. 8 is same as the processing in S105 of FIG. 7. When it is determined that the rotational angle sensor 75 is not normal (S113: NO), advancement is made to S115. When it is determined that the rotational angle sensor 75 is normal (S113: YES), advancement is made to S114.

In S114, a determination is made as to whether a precondition for a terminal voltage check of the first system 100 is satisfied. The processing in S114 is same as the processing in S106 of FIG. 7. When it is determined that the precondition for the terminal voltage check of the first system 100 is not satisfied (S114: NO), that is, when the motor rotation speed N is as high as or higher than the rotation speed threshold Nth, the determination processing is repeated during the precondition waiting time. When it is determined that the precondition for the terminal voltage check of the first system 100 is satisfied (S114: YES), that is, when the motor rotation speed N is lower than the rotation speed threshold Nth, advancement is made to S119.

Processing in S115 to which advancement is made when it is determined that the rotational angle sensor 75 is not normal (S113: NO) and processing in subsequent S116 and S117 are same as the processing in S107, S108, and S109 of FIG. 7, respectively.

In S118 to which advancement is made when it is determined that the second failure flag Flg2 is OFF (S115: YES) and that the first terminal voltage amplitude M1 and the second terminal voltage amplitude M2 are normal (S116: YES), a determination is made as to whether a precondition for a terminal voltage check of the first system 100 is satisfied. Processing in S118 is same as the processing in S110 of FIG. 7. When it is determined that the precondition for the terminal voltage check of the first system 100 is not satisfied (S118: NO), that is, when the first terminal voltage amplitude M1 is as large as or larger than the first determination feasibility threshold Mth1, the determination processing is repeated during the precondition waiting time. When it is determined that the precondition for the terminal voltage check of the first system 100 is satisfied (S118: YES), that is, when the first terminal voltage amplitude M1 is less than the first determination feasibility threshold Mth1, advancement is made to S119.

In S119 to which advancement is made when it is determined that the precondition for the terminal voltage check of the first system 100 is satisfied (S114: YES or S118: YES), a determination is made as to whether the U1 terminal voltage Vu1, the V1 terminal voltage Vv1, and the W1 terminal voltage Vw1 are normal. When the U1 terminal voltage Vu1, the V1 terminal voltage Vv1, and the W1 terminal voltage Vw1 are normal, a sum of the U1 terminal voltage Vu1, the V1 terminal voltage Vv1, and the W1 terminal voltage Vw1 (hereinafter, referred to as a first system three-phase sum Vt1) is equal to a value 3/2 times as high as the first bus voltage Vr1. On the other hand, for example, in the event of a supply fault of the U1 coil 111, a short-circuit failure of the resistor 142, breaking of the resistor 143, or a short-circuit failure of the upper arm element 121, the U1 terminal voltage Vu1 takes a value different from the value in a normal state and therefore the first system three-phase sum Vt1 takes a value different from the value 3/2 times as high as the first bus voltage Vr1. The same applies to the V1 terminal voltage Vv1 and the W1 terminal voltage Vw1.

In view of the foregoing, it is determined in the present embodiment that at least one of the U1 terminal voltage Vu1, the V1 terminal voltage Vv1, and the W1 terminal voltage Vw1 is not normal when an absolute value of a difference between the product of the first system three-phase sum Vt1

(that is, Vu1+Vv1+Vw1) and ⅔ and the first bus voltage Vr1 is as large as or larger than a first failure determination value F1.

When it is determined that the U1 terminal voltage Vu1, the V1 terminal voltage Vv1, and the W1 terminal voltage Vw1 are normal (S119: YES), that is, when the absolute value of a difference between the product of the first system three-phase sum Vt1 and ⅔ and the first bus voltage Vr1 is less than the first failure determination value F1, advancement is made to S121 of FIG. 9. When it is determined that at least one of the U1 terminal voltage Vu1, the V1 terminal voltage Vv1, and the W1 terminal voltage Vw1 is not normal (S119: NO), that is, when the absolute value of a difference between the product of the first system three-phase sum Vt1 and ⅔ and the first bus voltage Vr1 is as large as or larger than the first failure determination value F1, advancement is made to S120.

In S120, the first failure flag Flg1 is turned ON, after which the first failure detection processing is ended.

Processing from S101 to S120 is processing relating to an failure determination of the circuit portion of the first system 100 and processing in S121 and subsequent steps is processing relating to an failure determination of an enable function.

Figure 9:
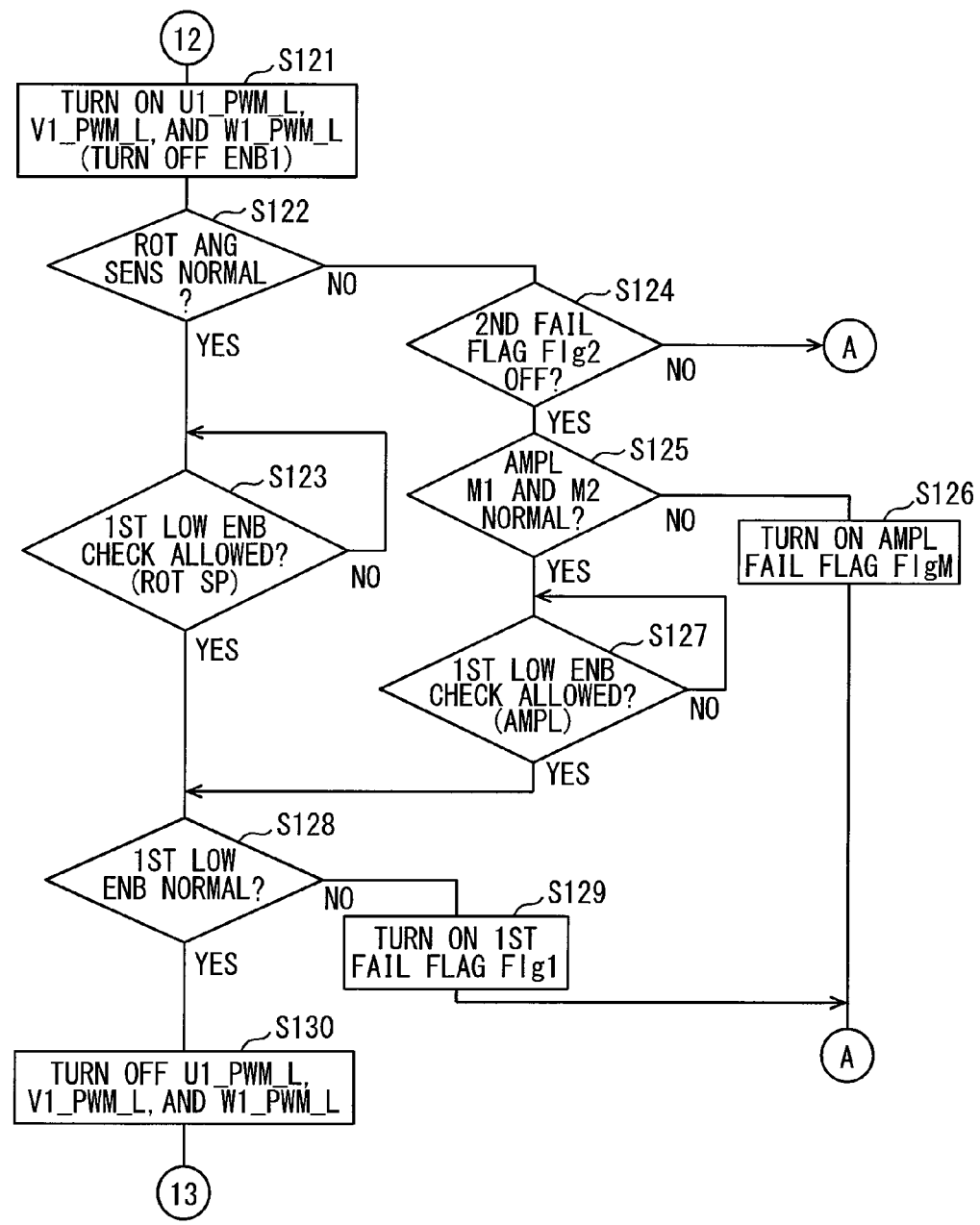
FIG. 9 is a flowchart continuing from FIG. 8 and depicting the first failure detection processing according to the first embodiment of the disclosure.

In S121 of FIG. 9, the PWM signals U1_PWM_L, V1_PWM_L, and W1_PWM_L relating to the driving of the lower arm elements 124, 125, and 126, respectively, of the first inverter 120 are generated as ON signals. Also, the first enable signal ENB1 remains as an OFF signal. In other words, when the first enable signal ENB1 functions normally, the lower arm elements 124 through 126 are not switched ON and an OFF state continues.

Processing in S122 is same as the processing in S105 of FIG. 7. When it is determined that the rotational angle sensor 75 is not normal (S122: NO), advancement is made to S124. When it is determined that the rotational angle sensor 75 is normal (S122: YES), advancement is made to S123.

In S123, a determination is made as to whether a precondition for a check of an enable function relating to the lower arm elements 124 through 126 of the first system 100 (hereinafter, referred to as the first lower enable function check) is satisfied. Processing in S123 is same as the processing in S106 of FIG. 7. When it is determined that the precondition for the first lower enable function check is not satisfied (S123: NO), that is, when the motor rotation speed N is as high as or higher than the rotation speed threshold Nth, the determination processing is repeated during the precondition waiting time. When it is determined that the precondition for the first lower enable function check is satisfied (S123: YES), that is, when the motor rotation speed N is lower than the rotation speed threshold Nth, advancement is made to S128.

Processing in S124 to which advancement is made when it is determined that the rotational angle sensor 75 is not normal (S122: NO) and processing in subsequent S125 and S126 are same as the processing in S107, S108, and S109 of FIG. 7, respectively.

In S127 to which advancement is made when it is determined that the second failure flag Flg2 is OFF (S124: YES) and that the first terminal voltage amplitude M1 and the second terminal voltage amplitude M2 are normal (S125: YES), a determination is made as to whether a precondition for the first lower enable function check is satisfied. Processing in S127 is same as the processing in S110 of FIG. 7. When it is determined that the precondition for the first lower enable function check is not satisfied (S127: NO), that is, when the first terminal voltage amplitude M1 is as large as or larger than the first determination feasibility threshold Mth1, the determination processing is repeated during the precondition waiting time. When it is determined that the precondition for the first lower enable function check is satisfied (S127: YES), that is, when the first terminal voltage amplitude M1 is less than the first determination feasibility threshold Mth1, advancement is made to S128.

In S128 to which advancement is made when it is determined that the precondition for the first lower enable function check is satisfied (S123: YES or S127: YES), a determination is made as to whether the first lower enable function is normal. When the first enable signal ENB1 functions normally for the first lower arm elements 124 through 126, an OFF state of the first lower arm elements 124 through 126 continues. Hence, the first system three-phase sum Vt1 is equal to the value 3/2 times as high as the first bus voltage Vr1. On the other hand, when the first enable signal ENB1 does not function normally for the first lower arm elements 124 through 126, for example, in the event of an failure of the first enable signal ENB1 itself or an failure of the first gate drive circuit 86, the first lower arm elements 124 through 126 are switched ON. Hence, the first system three-phase sum Vt1 takes a value different from the value 3/2 times as high as the first bus voltage Vr1.

In view of the foregoing, it is determined in the present embodiment that the first enable signal ENB1 does not function for the first lower arm elements 124 through 126, that is, the first lower enable function is not normal when the first system three-phase sum Vt1, which is found when the PWM signals U1_PWM_L, V1_PWM_L, and W1_PWM_L relating to the driving of the first lower arm elements 124 through 126, respectively, are generated as ON signals and the first enable signal ENB1 is generated as an OFF signal after the absence of an failure in the circuit portion of the first system 100 is confirmed, is multiplied by ⅔ and an absolute value of a difference between the product and the first bus voltage Vr1 is as large as or larger than the first failure determination value F1.

When it is determined that the first lower enable function is normal (S128: YES), advancement is made to S130. When it is determined that the first lower enable function is not normal (S128: NO), advancement is made to S129.

In S129, the PWM signals U1_PWM_L, V1_PWM_L, and W1_PWM_L relating to the driving of the first lower arm elements 124 through 126 are generated as OFF signals and the first failure flag Flg1 is turned ON, after which the first failure detection processing is ended.

Figure 10:
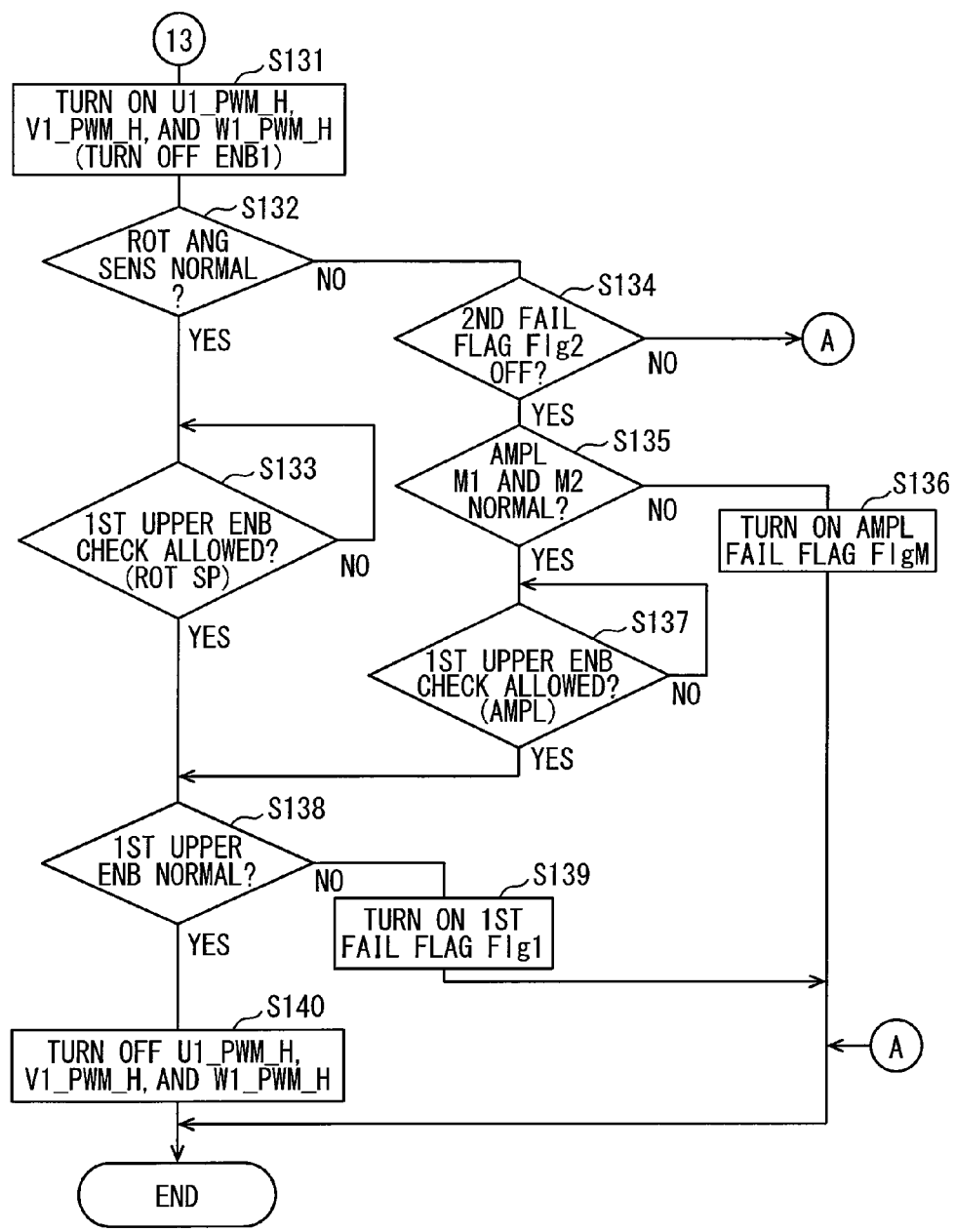
FIG. 10 is a flowchart continuing from FIG. 9 and depicting the first failure detection processing according to the first embodiment of the disclosure.
Figure 11:
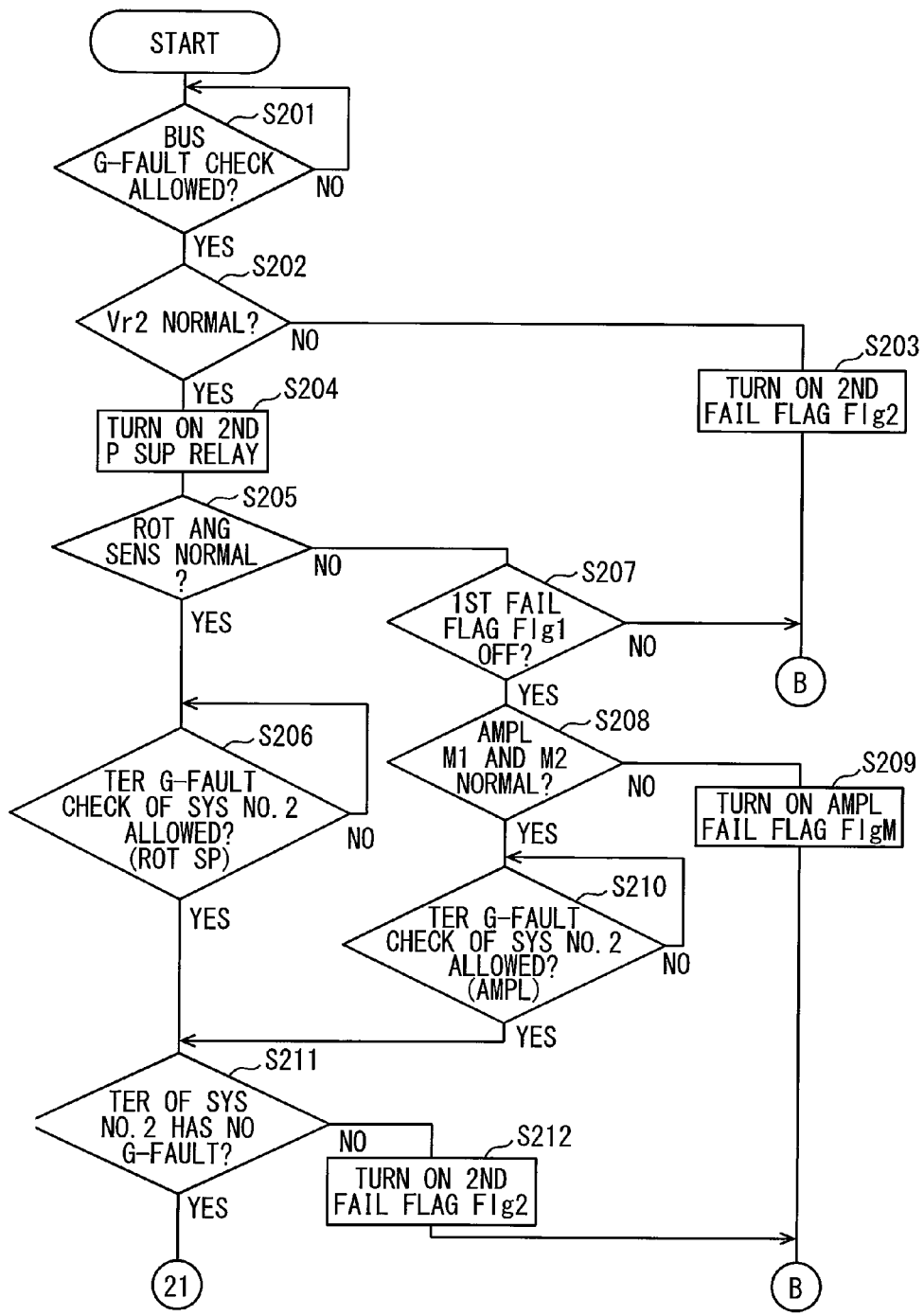
FIG. 11 is a flowchart depicting second failure detection processing according to the first embodiment of the disclosure.
Figure 12:
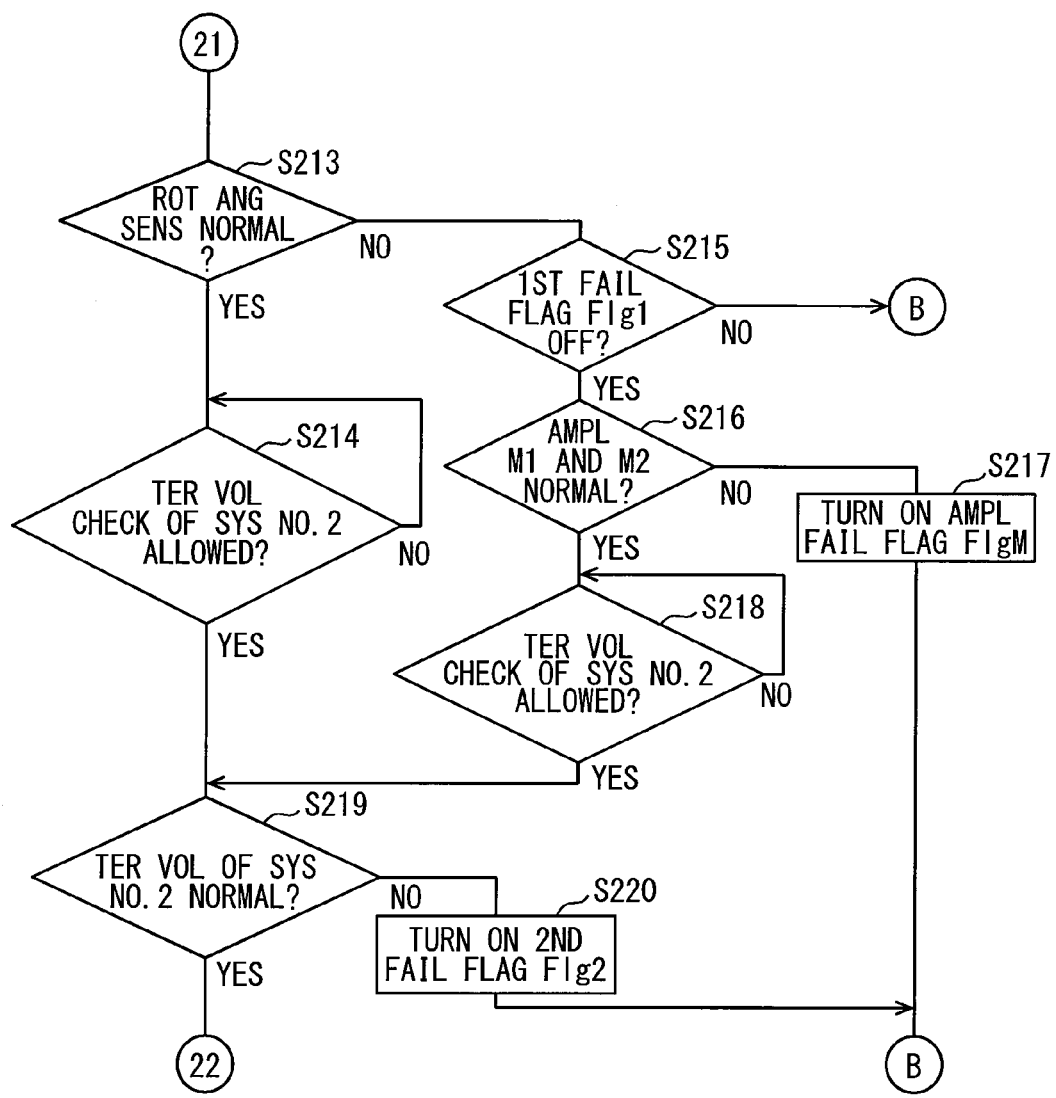
FIG. 12 is a flowchart continuing from FIG. 11 and depicting the second failure detection processing according to the first embodiment of the disclosure.

In S130, the PWM signals U1_PWM_L, V1_PWM_L, and W1_PWM_L relating to the driving of the first lower arm elements 124 through 126 are generated as OFF signals and advancement is made to S131 of FIG. 10.

In S131 of FIG. 10, the PWM signals U1_PWM_H, V1_PWM_H, and W1_PWM_H relating to the driving of the first upper arm elements 121 through 123 are generated as ON signals. Also, the first enable signal ENB1 remains as an OFF signal. In other words, when the first enable signal ENB1 functions normally, the first upper arm elements 121 through 123 are not switched ON and an OFF state continues.

Processing in S132 is same as the processing in S105 of FIG. 7. When it is determined that the rotational angle sensor 75 is not normal (S132: NO), advancement is made to S134. When it is determined that the rotational angle sensor 75 is normal (S132: YES), advancement is made to S133.

In S133, a determination is made as to whether a precondition for a check of an enable function relating to the upper arm elements 121 through 123 of the first system 100

(hereinafter, referred to as the first upper enable function check) is satisfied. Processing in S133 is same as the processing in S106 of FIG. 7. When it is determined that the precondition for the first upper enable function check is not satisfied (S133: NO), that is, when the motor rotation speed N is as high as or higher than the rotation speed threshold Nth, the determination processing is repeated during the precondition waiting time. When it is determined that the precondition for the first upper enable function check is satisfied (S133: YES), that is, when the motor rotation speed N is lower than the rotation speed threshold Nth, advancement is made to S138.

Processing in S134 to which advancement is made when it is determined that the rotational angle sensor 75 is not normal (S132: NO) and processing in subsequent S135 and S136 are same as the processing in S107, S108, and S109 of FIG. 7, respectively.

In S137 to which advancement is made when it is determined that the second failure flag Flg2 is OFF (S134: YES) and that the first terminal voltage amplitude M1 and the second terminal voltage amplitude M2 are normal (S135: YES), a determination is made as to whether a precondition for the first upper enable function check is satisfied. Processing in S137 is same as the processing in S110 of FIG. 7. When it is determined that the precondition for the first upper enable function check is not satisfied (S137: NO), that is, when the first terminal voltage amplitude M1 is as large as or larger than the first determination feasibility threshold Mth1, the determination processing is repeated during the precondition waiting time. When it is determined that the precondition for the first upper enable function check is satisfied (S137: YES), that is, when the first terminal voltage amplitude M1 is less than the first determination feasibility threshold Mth1, advancement is made to S138.

In S138 to which advancement is made when it is determined that the precondition for the first upper enable function check is satisfied (S133: YES or S137: YES), a determination is made as to whether the first upper enable function is normal. When the first enable signal ENB1 functions normally for the first upper arm elements 121 through 123, an OFF state of the first upper arm elements 121 through 123 continues. Hence, the first system three-phase sum Vt1 is equal to the value 3/2 times as high as the first bus voltage Vr1. On the other hand, when the first enable signal ENB1 does not function normally for the first upper arm elements 121 through 123, for example, in the event of an failure of the first enable signal ENB1 itself or an failure of the first gate drive circuit 86, the first upper arm elements 121 through 123 are switched ON. Hence, the first system three-phase sum Vt1 takes a value different from the value 3/2 times as high as the first bus voltage Vr1.

In view of the foregoing, it is determined in the present embodiment that the first enable signal ENB1 does not function for the first upper arm elements 121 through 123, that is, the first upper enable function is not normal when the first system three-phase sum Vt1, which is found when the PWM signals U1_PWM_H, V1_PWM_H, and W1_PWM_H relating to the driving of the first upper arm elements 121 through 123, respectively, are generated as ON signals and the first enable signal ENB1 is generated as an OFF signal after the absence of an failure in the circuit portion of the first system 100 is confirmed, is multiplied by 2/3 and an absolute value of a difference between the product and the first bus voltage Vr1 is as large as or larger than the first failure determination value F1.

When it is determined that the first upper enable function is normal (S138: YES), advancement is made to S140. When it is determined that the first upper enable function is not normal (S138: NO), advancement is made to S139.

In S139, the PWM signals U1_PWM_H, V1_PWM_H, and W1_PWM_H relating to the driving of the first upper arm elements 121 through 123, respectively, are generated as OFF signals and the first failure flag Flg1 is turned ON, after which the first failure detection processing is ended.

In S140, the PWM signals U1_PWM_H, V1_PWM_H, and W1_PWM_H relating to the driving of the first upper arm elements 121 through 123, respectively, are generated as OFF signals. Also, a first normality flag FlgC1 indicating that normality is determined and the first failure detection processing is ended is turned ON, after which the first failure detection processing is ended.

The second failure detection processing, which is the failure detection processing of the second system 200, will now be described according to FIG. 11 through FIG. 14. Processing in S201 through S240 relating to the second failure detection processing corresponds to processing in S101 through S140 of the first failure detection processing having the same last two digits. Hence, for the second failure detection processing, parameters relating to the second failure detection processing are chiefly described and a detailed description of the respective processing steps is omitted where appropriate. In the processing in the respective S201 through S240, configurations and parameters relating to the first system 100 and used in corresponding S101 through S140 are changed to configurations and parameters relating to the second system 200. Common Configurations and Parameters relating to the common configurations, such as the rotational angle sensor 75, are used intact.

In the second failure detection processing, the second failure flag Flg2 is used instead of the first failure flag Flg1 used in the first failure detection processing.

In S201 and S202, the second bus voltage Vr2 is used instead of the first bus voltage Vr1 used in S101 and S102, and a second bus ground-fault determination value VrG2 is used instead of the first bus ground-fault determination value VrG1. Likewise, the second bus voltage Vr2 is used instead of the first bus voltage Vr1 in steps other than S201 and S202. In the present embodiment, the second bus ground-fault determination value VrG2 is equal to the first bus ground-fault determination value VrG1. However, the second bus ground-fault determination value VrG2 may be different from the first bus ground-fault determination value VrG1.

In S207, S215, S224, and S234, a determination is made as to whether the first failure flag Flg1 is OFF. The first failure flag Flg1 is a flag that is set when an failure is detected in the first failure detection processing (see FIG. 7 through FIG. 10) performed in parallel with the second failure detection processing. When it is determined that the first failure flag Flg1 is ON, a determination of NO is made and the second failure detection processing is ended. When it is determined that the first failure flag Flg1 is OFF, a determination of YES is made and advancement is made to the subsequent step.

Processing in S208, S216, S225, and S235 is same as the processing in S108 of FIG. 7.

Processing in S209, S217, S226, and S236 is same as the processing in S109 of FIG. 7.

In the steps specified above, the parameters are used intact.

In S210, S218, S227, and S237, the second terminal voltage amplitude M2 is used instead of the first terminal voltage amplitude M1 used in S110, S118, S127, and S137, and a second determination feasibility threshold Mth2 is used instead of the first determination feasibility threshold Mth1. The second determination feasibility threshold Mth2 is set to a predetermined value which is ½ the second bus voltage Vr2 or less. In the present embodiment, the second determination feasibility threshold Mth2 has a same value as the first determination feasibility threshold Mth1. However, the second determination feasibility threshold Mth2 may have a value different from the value of the first determination feasibility threshold Mth1.

In S211, the U2 terminal voltage Vu2, the V2 terminal voltage Vv2, and the W2 terminal voltage Vw2 are used, respectively, instead of the U1 terminal voltage Vu1, the V1 terminal voltage Vv1, and the W1 terminal voltage Vw1 used in S111. Also, a U2 terminal ground-fault determination value VuG2, a V2 terminal ground-fault determination value VvG2, and a W2 terminal ground-fault determination value VwG2 are used, respectively, instead of the U1 terminal ground-fault determination value VuG1, the V1 terminal ground-fault determination value VvG1, and the W1 terminal ground-fault determination value VwG1. Because the resistance values of the respective phases are equal, the terminal ground-fault determination values VuG2, VvG2, and VwG2 are also equal. However, the terminal ground-fault determination values VuG2, VvG2, and VwG2 may have different values. In addition, the terminal ground-fault determination values VuG2, VvG2, and VwG2 are equal to the terminal ground-fault determination values VuG1, VvG1, and VwG1 used in the first failure detection processing. However, the former and the latter may be different.

In S219, the U2 terminal voltage Vu2, the V2 terminal voltage Vv2, and the W2 terminal voltage Vw2 are used, respectively, instead of the U1 terminal voltage Vu1, the V1 terminal voltage Vv1, and the W1 terminal voltage Vw1 used in S119. Also, a second system three-phase sum Vt2, which is a sum of the U2 terminal voltage Vu2, the V2 terminal voltage Vv2, and the W2 terminal voltage Vw2, is used instead of the first system three-phase sum Vt1.

Further, a second failure determination value F2 is used instead of the first failure determination value F1. In the present embodiment, the second failure determination value F2 is equal to the first failure determination value F1. However, the second failure determination value F2 may be different from the first failure determination value F1.

The same applies to S228 and S238.

Figure 13:
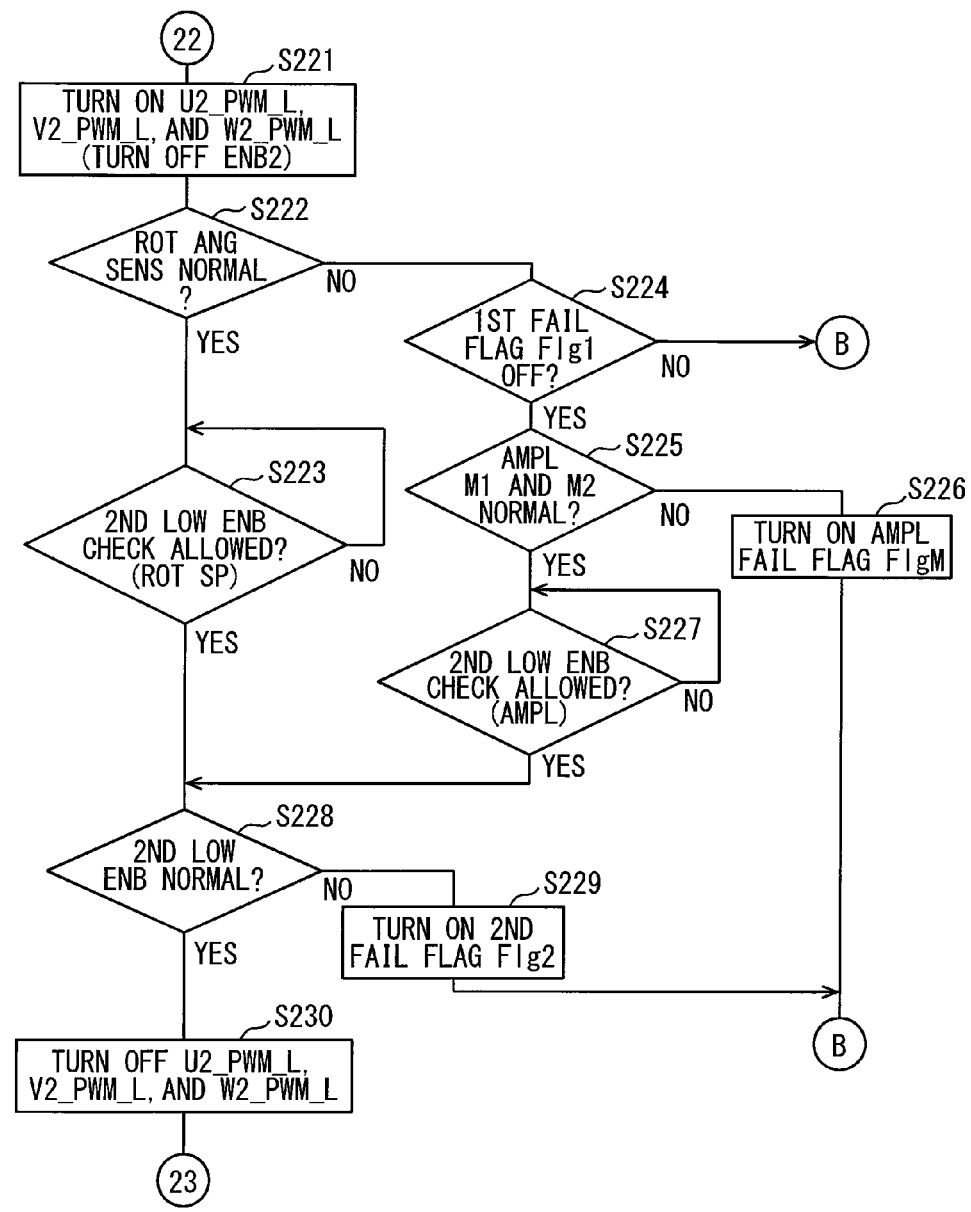
FIG. 13 is a flowchart continuing from FIG. 12 and depicting the second failure detection processing according to the first embodiment of the disclosure.

FIG. 13 shows processing to check an enable function relating to the lower arm elements 224 through 226 of the second system 200 (hereinafter, referred to as the second lower enable function check). In each processing of FIG. 13, the PWM signals U2_PWM_L, V2_PWM_L, and W2_PWM_L relating, respectively, to the driving of the lower arm elements 224, 225, and 226 of the second inverter 220 are used, respectively, instead of the PWM signals U1_PWM_L, V1_PWM_L, and W1_PWM_L used in each processing of FIG. 9, and the second enable signal ENB2 is used instead of the first enable signal ENB1.

Figure 14:
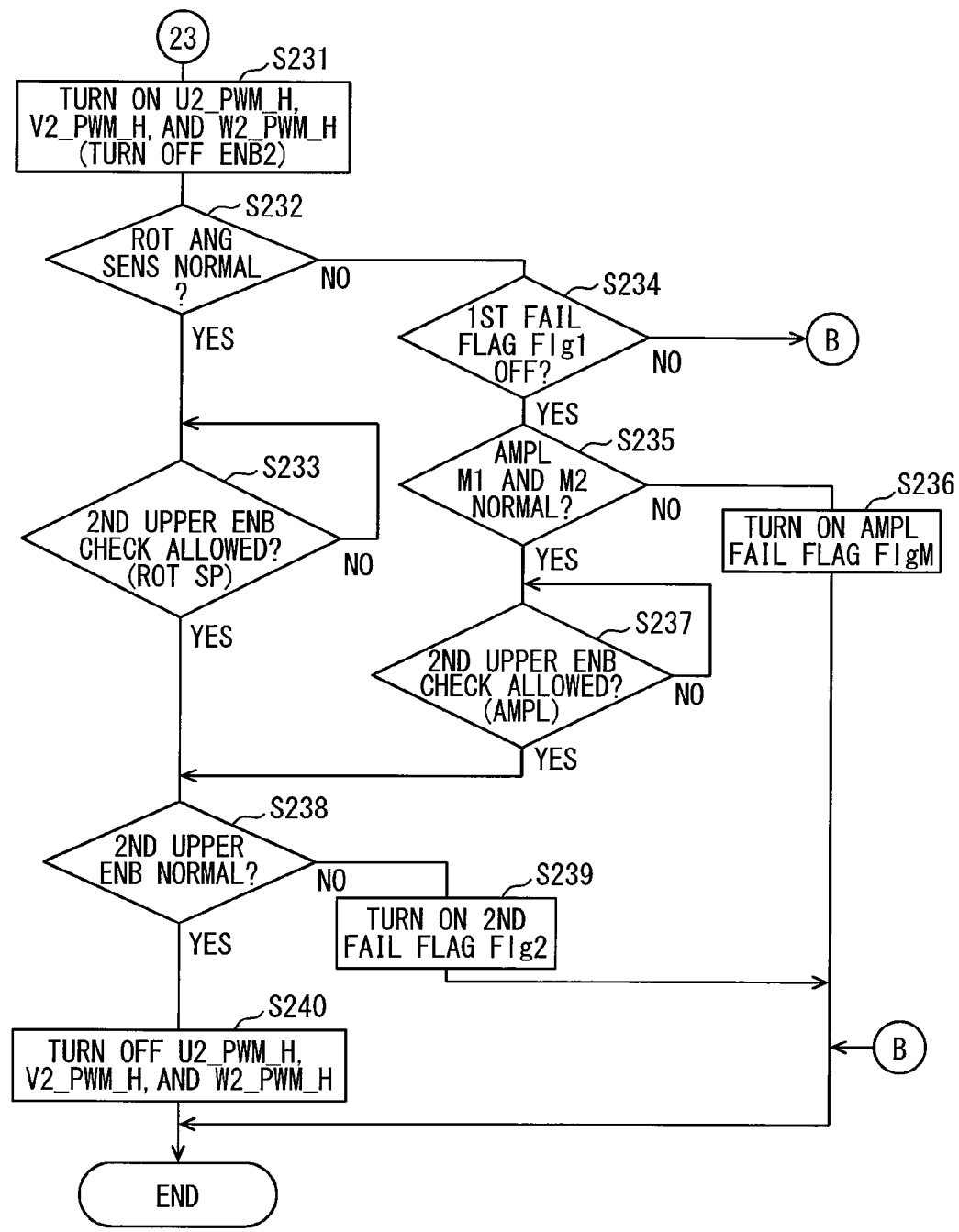
FIG. 14 is a flowchart continuing from FIG. 13 and depicting the second failure detection processing according to the first embodiment of the disclosure.

FIG. 14 shows processing to check an enable function relating to the upper arm elements 221 through 223 of the second system 200 (hereinafter, referred to as the second upper enable function check). In each processing of FIG. 14, the PWM signals U2_PWM_H, V2_PWM_H, and W2_PWM_H relating, respectively, to the driving of the second upper arm elements 221, 222, and 223 are used, respectively, instead of the PWM signals U1_PWM_H, V1_PWM_H, and W1_PWM_H used in each processing of FIG. 10, and the second enable signal ENB2 is used instead of the first enable signal ENB1.

Figure 15:
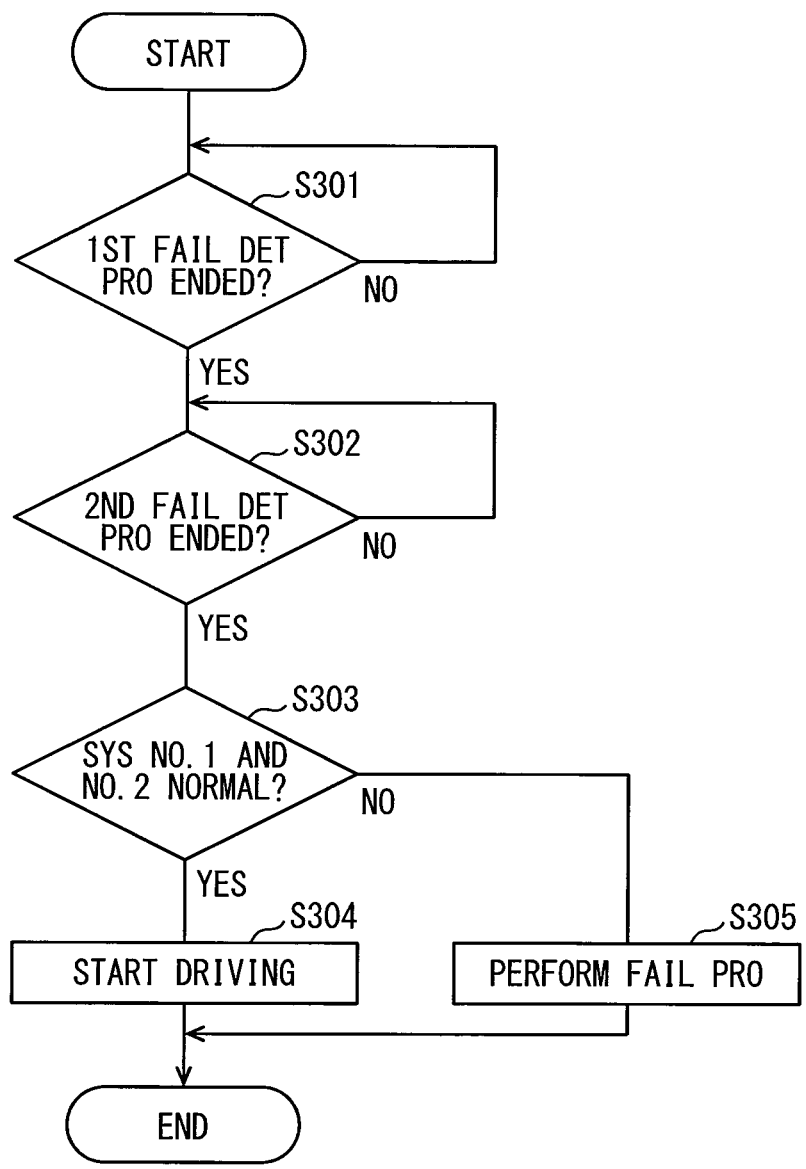
FIG. 15 is a flowchart depicting motor drive processing according to the first embodiment of the disclosure.

Motor drive processing relating to the driving of the motor 10 after the initial check will be described according to the flowchart of FIG. 15.

In S301, a determination is made as to whether the first failure detection processing is ended. When it is determined that the first failure detection processing is not ended (S310: NO), that is, when all of the first failure flag Flg1, the amplitude failure flag FlgM, and the first normality flag FlgC1 are OFF, the determination processing is repeated. When it is determined that the first failure detection processing is ended (S301: YES), that is, when the first failure flag Flg1, the amplitude failure flag FlgM, or the first normality flag FlgC1 is ON, advancement is made to S302.

In S302, a determination is made as to whether the second failure detection processing is ended. When it is determined that the second failure detection processing is not ended (S302: NO), that is, when all of the second failure flag Flg2, the amplitude failure flag FlgM, and a second normality flag FlgC2 are OFF, the determination processing is repeated. When it is determined that the second failure detection processing is ended (S302: YES), that is, when the second failure flag Flg2, the amplitude failure flag FlgM, or the second normality flag FlgC2 is ON, advancement is made to S303.

In S303, a determination is made as to whether both of the first system 100 and the second system 200 are normal. When it is determined that both of the first system 100 and the second system 200 are normal (S303: YES), that is, when both of the first normality flag FlgC1 and the second normality flag FlgC2 are ON, advancement is made to S304. When it is determined that at least one of the first system 100 and the second system 200 is not normal (S303: NO), that is, when at least one of the first failure flag Flg1, the second failure flag Flg2, and the amplitude failure flag FlgM is ON, advancement is made to S305.

In S304, the driving of the motor 10 is started.

In S305, failure processing is performed.

As has been described in detail above, the control device 1 of the present embodiment controls the motor 10 having the first winding set 110 made up of the coils 111 through 113 of multiple phases and the second winding set 210 made up of the coils 211 through 213 of multiple phases, and includes the inverters 120 and 220, the terminal voltage detection portions 140 and 240, the resistors 151 through 153 and 251 through 253, and the control portion 80.

The first inverter 120 has the first upper arm elements 121 through 123 connected to the high-potential side and the first lower arm elements 124 through 126 connected to the low-potential sides of the first upper arm elements 121 through 123, respectively, and converts a current to be passed over the coils 111 through 113.

The second inverter 220 has the second upper arm elements 221 through 223 connected to the high-potential side and the second lower arm elements 224 through 226 connected to the low-potential sides of the second upper arm elements 221 through 223, respectively, and converts power of the motor 10.

The first terminal voltage detection portion 140 detects the terminal voltages Vu1, Vv1, and Vw1 of the respective phase of the coils 111, 112, and 113, respectively. The second terminal voltage detection portion 240 detects the terminal voltages Vu2, Vv2, and Vw2 of the respective phases of the coils 211, 212, and 213, respectively.

The pull-up resistors 151 through 153 connect the respective phases of the coils 111 through 113 and the positive electrode of the battery 5. The pull-up resistors 251 through 253 connect the respective phases of the coils 211 through 213 and the positive electrode of the battery 5.

The control portion 80 has the signal generation portion 83 and the failure detection portion 84.

The signal generation portion 83 generates control signals that control ON and OFF actions of the upper arm elements 121 through 123 and 221 through 223 and the lower arm elements 124 through 126 and 224 through 226.

The failure detection portion 84 performs an failure detection on the basis of the first system three-phase sum Vt1, which is a sum of the terminal voltages Vu1, Vv1, and Vw1 of all the respective phases when all of the control signals relating to the upper arm elements 121 through 123 and 211 through 213 and the lower arm elements 124 through 126 and 224 through 226 are OFF commands and the motor rotation speed N is lower than the predetermined rotation speed threshold Nth.

The failure detection portion 84 also performs an failure detection on the basis of the second system three-phase sum Vt2, which is a sum of the terminal voltages Vu2, Vv2, and Vw2 of all the respective phases when all of the control signals relating to the upper arm elements 121 through 123 and 211 through 213 and the lower arm elements 124 through 126 and 224 through 226 are OFF commands and the motor rotation speed N is lower than the predetermined rotation speed threshold Nth.

In the case of a motor that is not driven by an external force other than power corresponding to the control signals, when all of the control signals are OFF commands, the motor is not driven and hence no counter-electromotive force is generated. On the other hand, when the motor 10 is driven by an external force other than power corresponding to the control signals as in the present embodiment, a counter-electromotive force may possibly be generated even when all of the control signals are OFF commands.

In the present embodiment, such a possibility is eliminated by performing an failure detection relating to the first system 100 on the basis of the first system three-phase sum Vt1, which is unsusceptible to a counter-electromotive force, in a range of the rotation speed of the motor 10 within which the terminal voltages Vu1, Vv1, and Vw1 are not limited by a voltage of the first positive-side bus 165 or the first negative-side bus 166.

Likewise, an failure detection relating to the second system 200 is performed on the basis of the second system three-phase sum Vt2, which is unsusceptible to a counter-electromotive force, in a range of the rotation speed of the motor 10 within which the terminal voltages Vu2, Vv2, and Vw2 are not limited by a voltage of the second positive-side bus 265 or the second negative-side bus 266.

Owing to the configuration as above, an failure detection can be performed appropriately without the influence of a counter-electromotive force in a system in which the motor 10 may possibly be driven by an external force even when all of the control signals relating to the upper arm elements 121 through 123 and 221 through 223 and the lower arm elements 124 through 126 and 224 through 226 are OFF commands as in the initial check or the like.

The control device 1 determines whether the motor rotation speed N is lower than the rotation speed threshold Nth on the basis of the rotation speed N computed on the basis of the rotational angle θ of the motor 10. Accordingly, whether an failure detection is feasible or not can be determined appropriately.

In a case where the rotational angle sensor 75 is normal, the failure detection portion 84 determines whether the motor rotation speed N is lower than the rotation speed threshold Nth on the basis of the rotation speed N computed on the basis of the rotational angle θ.

In a case where the rotational angle sensor 75 is not normal, the failure detection portion 84 assumes that the motor rotation speed N is lower than the rotation speed threshold Nth when the first terminal voltage amplitude M1, which is the amplitude of the terminal voltages Vu1, Vv1, and Vw1, is less than the predetermined first determination feasibility threshold Mth1.

Owing to the configuration as above, whether an failure detection is feasible or not can be determined appropriately even when the rotational angle sensor 75 is not normal.

The motor 10 has the multiple winding sets 110 and 210, and the inverters 120 and 220 are provided to the winding sets 110 and 210, respectively.

In a case where it is determined that the rotational angle sensor 75 is not normal and that the first terminal voltage amplitude M1 computed for the inverter 120 and the second terminal amplitude M2 computed for the inverter 220 are normal from a comparison between the first terminal voltage amplitude M1 and the second terminal amplitude M2, the failure detection portion 84 assumes that the motor rotation speed N is lower than the rotation speed threshold Nth when the first terminal voltage amplitude M1 is less than the first determination feasibility threshold Mth1.

Likewise, in a case where it is determined that the rotational angle sensor 75 is not normal and that the first terminal voltage amplitude M1 computed for the inverter 120 and the second terminal amplitude M2 computed for the inverter 220 are normal from a comparison between the first terminal voltage amplitude M1 and the second terminal amplitude M2, the failure detection portion 84 assumes that the motor rotation speed N is lower than the rotation speed threshold Nth when the second terminal voltage amplitude M2 is less than the second determination feasibility threshold Mth2.

In the present embodiment, it is assumed that two or more systems are present and the amplitude of the terminal voltages is computed for each system and a determination is made as to whether the computed amplitudes of the terminal voltages are normal according to a comparison result between the computed amplitudes of the terminal voltages. Owing to the configuration as above, in a case where the computed amplitude of the terminal voltages is not normal, an erroneous determination made when an failure determination is performed on the basis of such terminal voltages can be avoided. Hence, whether an failure detection on the basis of the terminal voltages is feasible or not can be determined more appropriately.

The control device 1 includes the first bus voltage detection portion 155 that detects the first bus voltage Vr1, which is a voltage of the first positive-side bus 165 connecting the high-potential sides of the first upper arm elements 121 through 123 and the positive electrode of the battery 5.

The control device 1 also includes the second bus voltage detection portion 255 that detects the second bus voltage Vr2, which is a voltage of the second positive-side bus 265 connecting the high-potential sides of the second upper arm elements 221 through 223 and the positive electrode of the battery 5.

The failure detection portion 84 performs an failure detection for the first inverter 120, the motor 10, or the control signals on the basis of the first system three-phase sum Vt1 and the first bus voltage Vr1.

The terminal voltages Vu1, Vv1, and Vw1 vary with a variation of the first bus voltage Vr1. Hence, an failure detection can be performed more accurately by using the first bus voltage Vr1 in the failure detection.

Likewise, the terminal voltages Vu2, Vv2, and Vw2 vary with a variation of the second bus voltage Vr2. Hence, an failure detection can be performed more accurately by using the second bus voltage Vr2 in the failure detection.

The control device 1 of the present embodiment is applied to the electric power steering device 2, which is "a system in which the rotating electric machine may possibly be driven by an external force even when all of the control signals are OFF commands". The electric power steering device 2 includes the control device 1 and the motor 10 that outputs an assisting torque to assist the steering by the driver.

In the electric power steering device 2, the motor 10 rotates in response to an operation on the steering wheel 91 by the driver even when all of the control signals relating to the upper arm elements 121 through 123 and 221 through 223 and the lower arm elements 124 through 126 and 224 through 226 are OFF commands.

In the present embodiment, however, an failure detection is performed by giving consideration to a counter-electromotive force generated when the motor 10 is driven by an external force other than power corresponding to the control signals. Hence, an failure detection can be performed appropriately even when the motor 10 rotates in response to an operation on the steering wheel 91.

Other Embodiments

In the first embodiment above, two winding sets and two inverters are provided. However, one or three or more winding sets and one or three or more inverters may be provided in other embodiments.

In the first embodiment above, the rotating electric machine control device has three phases. However, the rotating electric machine control device may have four or more phases in other embodiments.

In the first embodiment above, the upper arm elements and the lower arm elements are formed of MOSFETs. However, field effect transistors other than MOSFETs, IGBTs (Insulated Gate Bipolar Transistors), or the like may be used instead in other embodiments.

In the first embodiment above, the current sensors are formed of shunt resistors. However, the current sensors are not limited to the shunt resistors in other embodiments and may be hall ICs or the like. In the first embodiment above, the current sensors are provided between the respective lower arm elements and the negative-side bus. However, the current sensors may be provided to any point where a current is detectable in other embodiments.

In the first embodiment above, the bus voltage detection portions are provided. However, the bus voltage detection portions may be omitted in other embodiments, for example, by assuming that the bus voltages are constant.

In addition, the rotational angle sensor may be omitted.

In the first embodiment above, the rotating electric machine control device is applied to the electric power steering device. However, the rotating electric machine control device may be applied to devices other than the electric power steering device in other embodiments.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A rotating electric machine control device for controlling a rotating electric machine having at least one winding set, which includes a plurality of windings for a plurality of phases respectively, the rotating electric machine control device comprising:
   at least one inverter having an upper arm element connected to a high-potential side and a lower arm element connected to a low-potential side of the upper arm element, and converting an electric power of the rotating electric machine;
   a terminal voltage detection device detecting a terminal voltage of each phase of a respective winding;
   a resistor connecting each phase of a respective winding and a positive side of a power supply; and
   a control device having a signal generation device that generates a control signal for controlling an on and off operation of the upper arm element and the lower arm element, and a failure detection device that detects a failure based on a sum of the terminal voltage in all of the phases when all of the control signals relating to the upper arm element and the lower arm element represents an off command, and a rotation speed of the rotating electric machine is lower than a predetermined rotation speed threshold.

2. The rotating electric machine control device according to claim 1, further comprising:
   a rotational angle sensor detecting a rotational angle of the rotating electric machine, wherein:
   the failure detection device determines whether the rotation speed is lower than the rotation speed threshold, based on the rotation speed calculated by the rotational angle.

3. The rotating electric machine control device according to claim 2, wherein:
   in a case where the rotational angle sensor is normal, the failure detection device determines whether the rotation speed is lower than the rotation speed threshold, based on the rotation speed calculated by the rotation angle; and
   in a case where the rotational angle sensor is not normal, the failure detection device estimates that the rotation speed is lower than the rotation speed threshold when an amplitude of the terminal voltage is less than a predetermined determination feasibility threshold.

4. The rotating electric machine control device according to claim 3, wherein:
   the at least one winding set includes a plurality of winding sets;
   the at least one inverter includes a plurality of inverters, each of which corresponds to one of the winding sets; and
   in a case where the rotational angle sensor is not normal, and the amplitude of the terminal voltage is normal according to a comparison among the amplitudes of the terminal voltages calculated for the inverters respectively, the failure detection device estimates that the rotation speed is less than the rotation speed threshold when the amplitude of the terminal voltage is less than the determination feasibility threshold.

5. The rotating electric machine control device according to claim 1, further comprising:
a bus voltage detection device detecting a bus voltage of a positive-side bus connecting a high-potential side of the upper arm element and the positive-side of the power supply, wherein:
the failure detection device detects a failure based on the bus voltage and a sum of the terminal voltages of all the phases.

6. An electric power steering device comprising:
the rotating electric machine control device according to claim 1; and
the rotating electric machine outputting an assisting torque to assist a steering operation of a driver.

* * * * *